US012693805B2

(12) United States Patent
Liu et al.

(10) Patent No.: US 12,693,805 B2
(45) Date of Patent: Jul. 28, 2026

(54) MANAGEMENT COMMAND TECHNIQUES FOR STACKED MEMORY ARCHITECTURES

(71) Applicant: Micron Technology, Inc., Boise, ID (US)

(72) Inventors: Chun-Yi Liu, Rancho Cordova, CA (US); Ameen D. Akel, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/771,865

(22) Filed: Jul. 12, 2024

(65) Prior Publication Data

US 2025/0036316 A1 Jan. 30, 2025
US 2025/0272026 A2 Aug. 28, 2025

Related U.S. Application Data

(60) Provisional application No. 63/516,193, filed on Jul. 28, 2023.

(51) Int. Cl.
G06F 3/06 (2006.01)

(52) U.S. Cl.
CPC .......... G06F 3/0659 (2013.01); G06F 3/0619 (2013.01); G06F 3/0679 (2013.01)

(58) Field of Classification Search
CPC .... G06F 3/0659; G06F 3/0619; G06F 3/0679; G06F 3/0604; G06F 3/0658; G06F 3/0685

See application file for complete search history.

(56) References Cited

U.S. PATENT DOCUMENTS

| | | | | |
|---|---|---|---|---|
| 8,386,699 B2 * | 2/2013 | Yeh | ........................ | G06F 3/0611 |
| | | | | 711/170 |
| 10,769,011 B2 * | 9/2020 | Kodera | ............... | G06F 11/1052 |
| 11,681,467 B2 * | 6/2023 | Nubile | ............... | G06F 12/0246 |
| | | | | 711/154 |
| 2009/0132736 A1 * | 5/2009 | Hasan | ................. | G06F 13/4282 |
| | | | | 710/56 |
| 2020/0185044 A1 * | 6/2020 | Takada | ................. | G11C 29/023 |
| 2022/0057958 A1 * | 2/2022 | Patriarca | ................. | G06F 3/061 |
| 2023/0376238 A1 * | 11/2023 | Lee | ........................ | G06F 3/0659 |
| 2024/0264863 A1 * | 8/2024 | Yang | ..................... | G06F 9/3836 |
| 2025/0147843 A1 * | 5/2025 | Gunasekaran | ...... | G06F 11/1068 |
| 2025/0149108 A1 * | 5/2025 | Mylavarapu | ........... | G11C 29/08 |

* cited by examiner

*Primary Examiner* — Zhuo H Li
(74) *Attorney, Agent, or Firm* — Holland & Hart LLP

(57) ABSTRACT

Methods, systems, and devices for management command techniques for stacked memory architectures are described. For example, a system may be configured to support management command signaling between a controller (e.g., of a host system) and interface circuitry (e.g., of a memory system) of a first semiconductor die that is configured for accessing one or more memory arrays (e.g., of the memory system) of one or more second semiconductor dies. The interface circuitry may be configured to schedule or otherwise determine that a management operation is to be performed, and may indicate a request to the controller to schedule aspects of the management operation. In response, the controller may indicate one or more commands to the interface circuitry to perform the management operation.

27 Claims, 9 Drawing Sheets

299

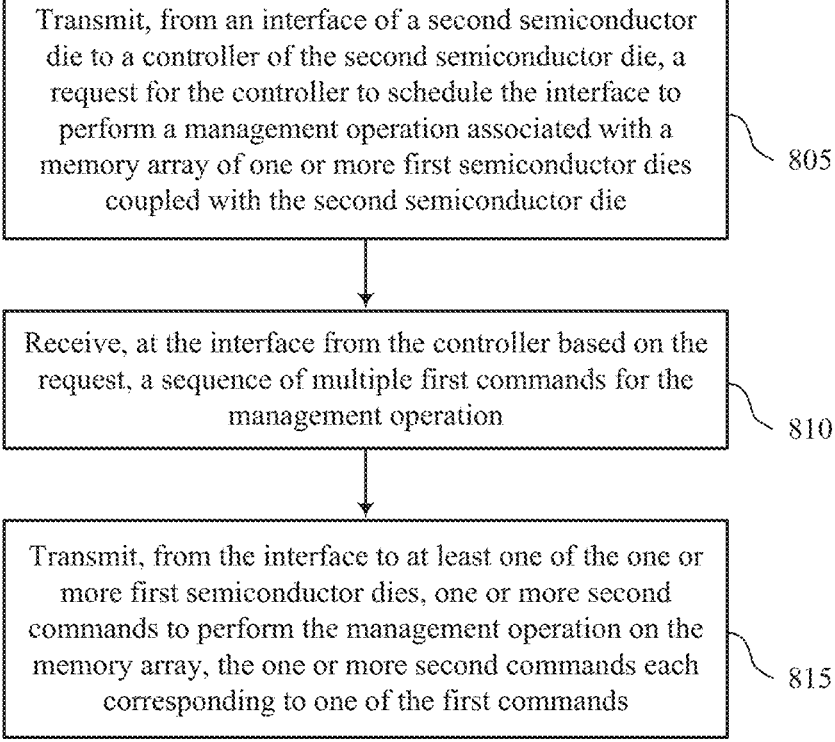

Transmit, from an interface of a second semiconductor die to a controller of the second semiconductor die, a request for the controller to schedule the interface to perform a management operation associated with a memory array of one or more first semiconductor dies coupled with the second semiconductor die

805

Receive, at the interface from the controller based on the request, a sequence of multiple first commands for the management operation

810

Transmit, from the interface to at least one of the one or more first semiconductor dies, one or more second commands to perform the management operation on the memory array, the one or more second commands each corresponding to one of the first commands

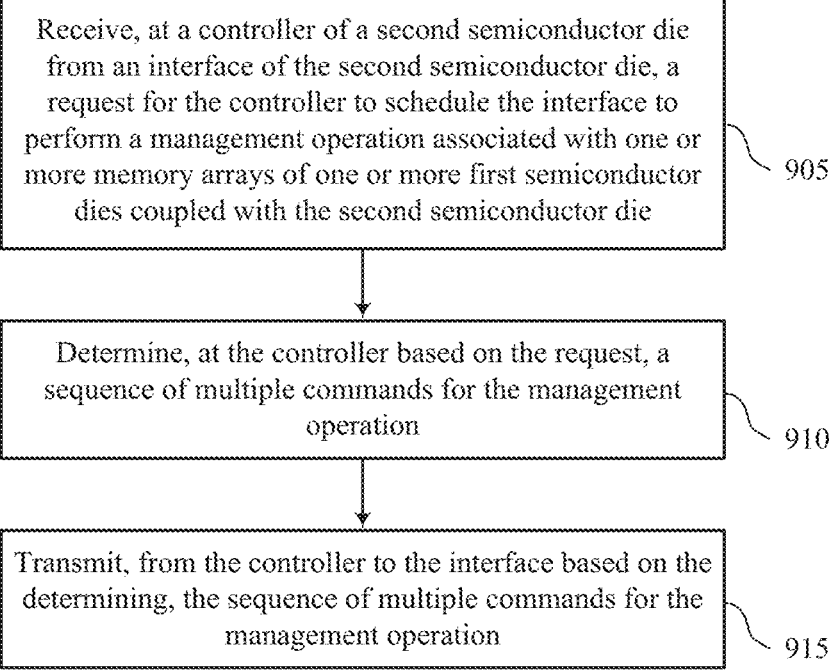

Receive, at a controller of a second semiconductor die from an interface of the second semiconductor die, a request for the controller to schedule the interface to perform a management operation associated with one or more memory arrays of one or more first semiconductor dies coupled with the second semiconductor die

905

Determine, at the controller based on the request, a sequence of multiple commands for the management operation

910

Transmit, from the controller to the interface based on the determining, the sequence of multiple commands for the management operation

MANAGEMENT COMMAND TECHNIQUES FOR STACKED MEMORY ARCHITECTURES

CROSS REFERENCE

The present Application for Patent claims priority to U.S. Patent Application No. 63/516,193 by LIU et al., entitled "MANAGEMENT COMMAND TECHNIQUES FOR STACKED MEMORY ARCHITECTURES," filed Jul. 28, 2023, each of which is assigned to the assignee hereof, and each of which is expressly incorporated by reference in its entirety herein.

TECHNICAL FIELD

The following relates to one or more systems for memory, including management command techniques for stacked memory architectures.

BACKGROUND

Memory devices are used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored by the memory cell. To store information, a memory device may write (e.g., program, set, assign) states to the memory cells. To access stored information, a memory device may read (e.g., sense, detect, retrieve, determine) states from the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells in a non-volatile configuration may maintain stored logic states for extended periods of time even in the absence of an external power source. Memory cells in a volatile configuration may lose stored states when disconnected from an external power source.

BRIEF DESCRIPTION OF THE DRAWINGS

FIGS. 8 and 9 show flowcharts illustrating methods that support management command techniques for stacked memory architectures in accordance with examples as disclosed herein.

DETAILED DESCRIPTION

Figure 1:
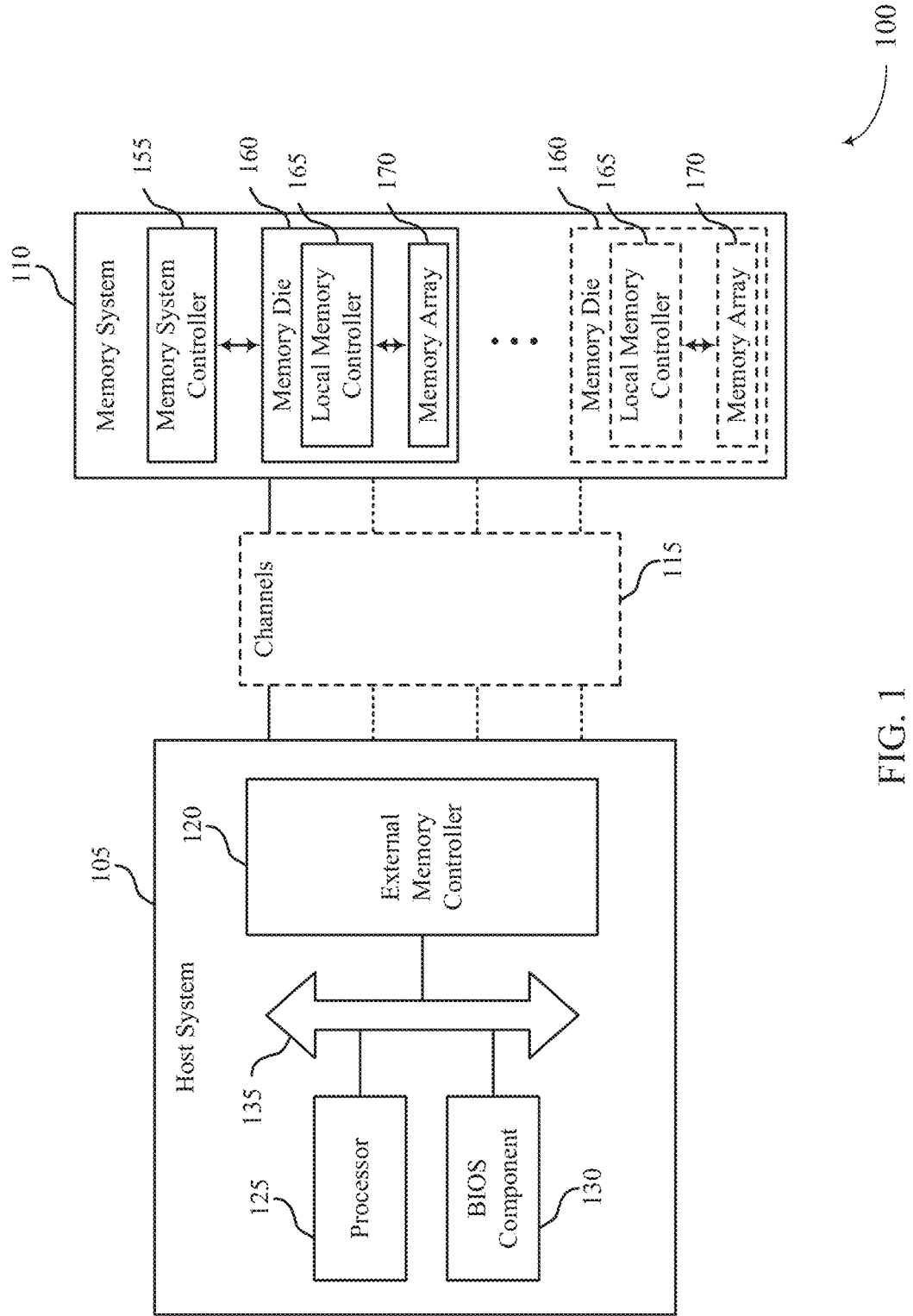
FIG. 1 shows an example of a system that supports management command techniques for stacked memory architectures in accordance with examples as disclosed herein.

Some memory systems may include a stack of semiconductor dies, including one or more memory dies (e.g., array dies) stacked with a logic die that is operable to access a set of memory arrays distributed across the one or more memory dies. Such a stacked architecture may be implemented as part of a coupled dynamic random access memory (DRAM) system, such as a 3D stacked memory system, and may support solutions for memory-centric logic, such as graphics processing units (GPUs), among other implementations. In some examples, a 3D stacked memory system may be closely coupled (e.g., physically coupled, electrically coupled, directly-coupled) with a processor, such as a GPU or other host, as part of a physical memory map accessible to the processor. Such coupling may include one or more processors being implemented in the same semiconductor die as at least a portion of a 3D stacked memory system (e.g., as part of a logic die), or one or more processors being implemented in a die that is directly coupled (e.g., fused) with another die that includes at least a portion of a 3D stacked memory system, or otherwise coupled with another die that includes at least a portion of a 3D stacked memory system (e.g., via a silicon interposer or other intervening component). Unlike cache-based memory, a 3D stacked memory system may not be backed by a level of external memory with the same physical addresses. For example, a 3D stacked memory system may be associated with and located within a dedicated base address, where each portion of the 3D stacked memory system may be non-overlapping within the address.

In some implementations, a memory system, such as a 3D stacked memory system, may perform management operations (e.g., memory management operations) to support or maintain operating characteristics of the memory system (e.g., performance characteristics for operating one or more memory arrays of the memory system). For example, such management operations may include refresh operations, adverse access (e.g., row hammer) mitigation operations, scrubbing operations, repair operations, or other operations. In some examples, logic of a memory system may be configured to determine when to perform management operations, which may involve coordination (e.g., scheduling, negotiation) of management operations with a host system that is coupled with the memory system. For example, management operations of a memory system may be coordinated with access operations (e.g., write operations, read operations) commanded by the host system to support an application of the host system.

In accordance with examples disclosed herein, a system may be configured to support management command signaling between a controller (e.g., of a host system) and interface circuitry (e.g., of a memory system, a memory interface block) of a first semiconductor die that is configured for accessing one or more memory arrays (e.g., of the memory system) of one or more second semiconductor dies. For example, the interface circuitry may be configured to schedule or otherwise determine that a management operation is to be performed, and may indicate (e.g., signal) a request to the controller to schedule aspects of the management operation. In response, the controller may indicate one or more commands to the interface circuitry to perform the management operation.

By supporting such management command signaling, the described techniques may support various improvements to operations of a system that includes a host system and a memory system. For example, by providing such an indication as a request to schedule aspects of the management operation (e.g., as a flexible request, as a request that may not be associated with an immediate response), a host system may be enabled to coordinate management operations with other operations (e.g., operations to support a function or application of the host system), such as access operations on one or more memory arrays of the memory system to support an application of the host system. Such techniques may allow the host system to prioritize relatively higher-priority access operations over the requested management operations. In some examples, such a request may include an indication of a duration within which a management operation is to be performed, which may support management operation commands being scheduled by the host system to be within a threshold duration that supports meeting an operating characteristic (e.g., reliability) of the memory system. In some examples, a management operation may be associated with a set (e.g., a sequence) of multiple operations (e.g., sub-operations, DRAM operations), such that a single request indication may be responded to with indications of a set of multiple commands in a manner that reduces request or command signaling (e.g., from the interface circuitry to the controller). In some implementations, such techniques may leverage an existing command set (e.g., a set of DRAM commands, a set of commands in accordance with a standardized interface protocol), which may support relatively simplified specification definitions, relatively simplified scheduling at the host system, and relatively flexible designs of or modifications to memory system interface circuitry, among other benefits.

Features of the disclosure are illustrated and described in the context of systems and dies. Features of the disclosure are further illustrated and described in the context of interface architectures, signaling diagrams, block diagrams, and flowcharts.

FIG. 1 shows an example of a system 100 that supports management command techniques for stacked memory architectures in accordance with examples as disclosed herein. The system 100 may include portions of an electronic device, such as a computing device, a mobile computing device, a wireless communications device, a graphics processing device, a vehicle, or other systems. The system 100 includes a host system 105, a memory system 110, and one or more channels 115 coupling the host system 105 with the memory system 110 (e.g., to provide a communicative coupling). The system 100 may include one or more memory systems 110, but aspects of the one or more memory systems 110 may be described in the context of a single memory system 110.

The host system 105 may be an example of a processing system (e.g., circuitry, one or more processors, an application processing system, processing circuitry, one or more processing components) that uses memory to execute processes (e.g., applications, functions, computations), such as a processing system of a computing device, a mobile computing device, a wireless communications device, a graphics processing device, a wearable device, an internet-connected device, a vehicle controller, a system on a chip (SoC), or other stationary or portable electronic device, among other examples. The host system 105 may include one or more of an external memory controller 120, a processor 125, a basic input/output system (BIOS) component 130, or other components (e.g., a peripheral component, an input/output controller, not shown). The components of the host system 105 may be coupled with one another using a bus 135.

An external memory controller 120 may be configured to enable communication of information (e.g., data, commands, control information, configuration information) between components of the system 100 (e.g., between components of the host system 105, such as the processor 125, and the memory system 110). For example, an external memory controller 120 may generate commands (e.g., in response to or to otherwise support an application of the host system 105) to write data to a memory system 110, or to read data from the memory system 110, or to otherwise communicate with a memory system 110. An external memory controller 120 may process (e.g., convert, translate) communications exchanged between the host system 105 and the memory system 110. In some examples, an external memory controller 120, or other component of the system 100, or associated functions described herein, may be implemented by or be part of the processor 125. For example, an external memory controller 120 may be hardware, firmware, or software (e.g., instructions), or some combination thereof implemented by a processor 125 or other component of the system 100 or the host system 105. Although an external memory controller 120 is illustrated outside the memory system 110, in some examples, an external memory controller 120, or its functions described herein, may be implemented by one or more components of a memory system 110 (e.g., a memory system controller 155, a local memory controller 165) or vice versa. In various examples, the host system 105 or an external memory controller 120 may be referred to as a host.

A processor 125 may be operable to provide functionality (e.g., control functionality, processing functionality) for the system 100 or the host system 105. A processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination thereof (e.g., as one or more processing components that are configured individually or collectively to support an application of the host system 105). In some examples, a processor 125 may be an example of a central processing unit (CPU), a graphics processing unit (GPU), a general-purpose GPU (GPGPU), or an SoC, among other examples.

In some examples, the system 100 or the host system 105 may include an input component, an output component, or a combination thereof. Input components may include a sensor, a microphone, a keyboard, another processor (e.g., on a printed circuit board), an interface (e.g., a user interface, an interface between other devices), or a peripheral that interfaces with system 100 via one or more peripheral components, among other examples. Output components may include a display, audio speakers, a printing device, another processor on a printed circuit board, or a peripheral that interfaces with the system 100 via one or more peripheral components, among other examples.

The memory system 110 may be a component of the system 100 that is operable to provide physical memory locations (e.g., addresses) that may be used or referenced by the system 100 (e.g., by the host system 105). The memory system 110 may include a memory system controller 155 and one or more memory dies 160 (e.g., memory chips) to support a capacity for data storage. The memory system 110 may be configurable to work with one or more different types of host systems 105, and may respond to and execute commands provided by the host system 105 (e.g., via an external memory controller 120). For example, the memory system 110 (e.g., a memory system controller 155) may receive a write command indicating that the memory system 110 is to store data received from the host system 105, or receive a read command indicating that the memory system 110 is to provide data stored in a memory die 160 to the host system 105, or receive a refresh command indicating that the memory system 110 is to refresh data stored in a memory die 160, among other types of commands and operations.

A memory system controller 155 may include components (e.g., circuitry, logic, instructions) operable to control operations of the memory system 110. A memory system controller 155 may include hardware, firmware, or instructions that enable the memory system 110 to perform various operations, and may be operable to receive, transmit, or execute commands, data, or control information related to operations of the memory system 110. A memory system controller 155 may be operable to communicate with one or more of an external memory controller 120, one or more memory dies 160, or a processor 125. In some examples, a memory system controller 155 may control operations of the memory system 110 in cooperation with a local memory controller 165 of a memory die 160.

Each memory die 160 may include one or more local memory controllers 165 and one or more memory arrays 170. A memory array 170 may be a collection of memory cells, with each memory cell being operable to store one or more bits of data. A memory array 170 may include a two-dimensional (2D) array of memory cells, or a three-dimensional (3D) array of memory cells. In some examples, a two-dimensional (2D) memory die 160 may include a single memory array 170. In some examples, a three-dimensional (3D) memory die 160 may include two or more memory arrays 170, which may be stacked or positioned beside one another (e.g., relative to a substrate).

A local memory controller 165 may include components (e.g., circuitry, logic, instructions) operable to control operations of a memory die 160. In some examples, a local memory controller 165 may be operable to communicate (e.g., receive or transmit data or commands or both) with a memory system controller 155. In some examples, a memory system 110 may not include a memory system controller 155, and a local memory controller 165 or an external memory controller 120 may perform various functions described herein. As such, a local memory controller 165 may be operable to communicate with a memory system controller 155, with other local memory controllers 165, or directly with an external memory controller 120, or a processor 125, or any combination thereof. Examples of components that may be included in a memory system controller 155 or a local memory controller 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, sense components for sensing states of memory cells of a memory array 170, write components for writing states to memory cells of a memory array 170, or various other components operable for supporting described operations of a memory system 110.

A host system 105 (e.g., an external memory controller 120) and a memory system 110 (e.g., a memory system controller 155) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, an electrically conductive path) between terminals associated with the components of the system 100. For example, a channel 115 may be associated with a first terminal (e.g., including one or more pins, including one or more pads) at the host system 105 and a second terminal at the memory system 110. A terminal may be an example of a conductive input or output point of a device of the system 100, and a terminal may be operable to act as part of a channel 115. In some implementations, at least the channels 115 between a host system 105 and a memory system 110 may include or be referred to as a host interface (e.g., a physical host interface). In some implementations, a host interface may include or be associated with interface circuitry (e.g., signal drivers, signal latches) at the host system 105 (e.g., at an external memory controller 120), or at the memory system 110 (e.g., at a memory system controller 155), or both.

In some examples, a channel 115 (e.g., associated signal paths and terminals) may be dedicated to communicating one or more types of information. For example, the channels 115 may include one or more command and address channels, one or more clock signal channels, one or more data channels, among other channels or combinations thereof. In some examples, signaling may be communicated via the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols of a signal may be registered for each clock cycle (e.g., on both a rising edge and a falling edge of a clock signal).

In some examples, at least a portion of the system 100 may implement a stacked die architecture in which multiple semiconductor dies are physically and communicatively coupled. In some such implementations, circuitry for accessing one or more memory arrays 170 (e.g., circuitry of a memory system 110) may be distributed among multiple semiconductor dies of a stack (e.g., a stack of multiple directly-coupled semiconductor dies). For example, a first die may include a set of multiple first interface blocks (e.g., memory interface blocks, instances of first interface circuitry) and one or more second dies may include corresponding second interface blocks, each coupled with a first interface block of the first die, that are each configured to access one or more memory arrays of the second dies. In some examples, the system may include a controller (e.g., a memory controller, a host interface controller, at least a portion of an external memory controller 120) for each set of one or more first interface blocks to support access operations (e.g., to access one or more memory arrays 170) via the set of first interface blocks. In some examples, such controllers may be located in the same first die as the first interface blocks.

A memory system 110 may perform management operations (e.g., memory management operations) to support or maintain operating characteristics of the memory system 110 (e.g., performance characteristics for operating one or more memory arrays 170, performance characteristics for operating one or more memory dies 160). For example, such management operations may include refresh operations, adverse access (e.g., row hammer) mitigation operations, scrubbing operations, repair operations, or other operations. In some examples, logic of a memory system 110 (e.g., of a memory system controller 155, of a local memory controller 165) may be configured to determine when to perform management operations, which may involve a coordination (e.g., scheduling, negotiation) of management operations with a host system 105. For example, management operations of a memory system 110 may be coordinated with access operations (e.g., write operations, read operations) commanded by the host system 105 to support an application of the host system 105.

In accordance with examples disclosed herein, a system 100 may be configured to support management command signaling between a controller (e.g., of a host system 105, such as aspects of an external memory controller 120) and interface circuitry (e.g., of a memory system 110, a memory interface block) of a first semiconductor die that is configured for accessing one or more memory arrays (e.g., of the memory system 110) of one or more second semiconductor dies. For example, the interface circuitry may be configured to schedule or otherwise determine that a management operation is to be performed, and may indicate (e.g., signal) a request to the controller to schedule aspects of the management operation. In response, the controller may indicate one or more commands to the interface circuitry to perform the management operation.

By supporting such management command signaling, the described techniques may support various improvements to operations of a system 100. For example, by providing such an indication as a request to schedule aspects of the management operation (e.g., as a flexible request, as a request that may not be associated with an immediate response), a host system 105 (e.g., an external memory controller 120, a scheduling component of a host system 105) may be enabled to coordinate management operations with other operations (e.g., operations to support a function or application of the host system 105), such as access operations on one or more memory arrays of the memory system 110 to support an application of the host system 105. Such techniques may allow the host system 105 to prioritize relatively higher-priority access operations over the management operations requested by the memory system 110. In some examples, such a request may include an indication of a duration within which a management operation is to be performed, which may support management operation commands being scheduled by the host system 105 to be within a threshold duration that supports meeting an operating characteristic of the memory system 110. In some examples, a management operation may be associated with a set (e.g., a sequence) of multiple operations (e.g., sub-operations, DRAM operations), such that a single request indication from a memory system 110 may be responded to by the host system 105 with indications of a set of multiple commands in a manner that reduces command signaling (e.g., from the memory system 110 to the host system 105). In some implementations, such techniques may leverage an existing command set (e.g., a set of DRAM commands, a set of commands in accordance with a standardized interface protocol), which may support relatively simplified specification definitions, relatively simplified scheduling at the host system 105, and relatively flexible designs of or modifications to interface circuitry of the memory system 110, among other benefits.

In addition to applicability in systems as described herein, management command techniques for stacked memory architectures may be generally implemented to support artificial intelligence or machine learning applications, among other types of computationally-intensive applications. As the use of artificial intelligence increases to support machine learning, analytics, decision making, or other related applications, electronic devices that support artificial intelligence applications and processes may be desired. For example, artificial intelligence applications may be associated with accessing relatively large quantities of data for analytical purposes and may benefit from memory systems capable of effectively and efficiently storing relatively large quantities of data or accessing stored data relatively quickly. Implementing the techniques described herein may support artificial intelligence and machine learning techniques by improving signaling of memory management operations, and scheduling thereof, thereby enabling memory interface circuitry to request memory management operations (e.g., to be performed within a requested duration), and enabling a host system to schedule responsive commands to perform the memory management operations along with scheduling of other operations, such as memory access operations. Such techniques may improve prioritization and allocation of resources between memory management and host applications, supporting high-performance host applications while meeting criteria for performance management of coupled memory arrays, among other benefits.

Figure 2:
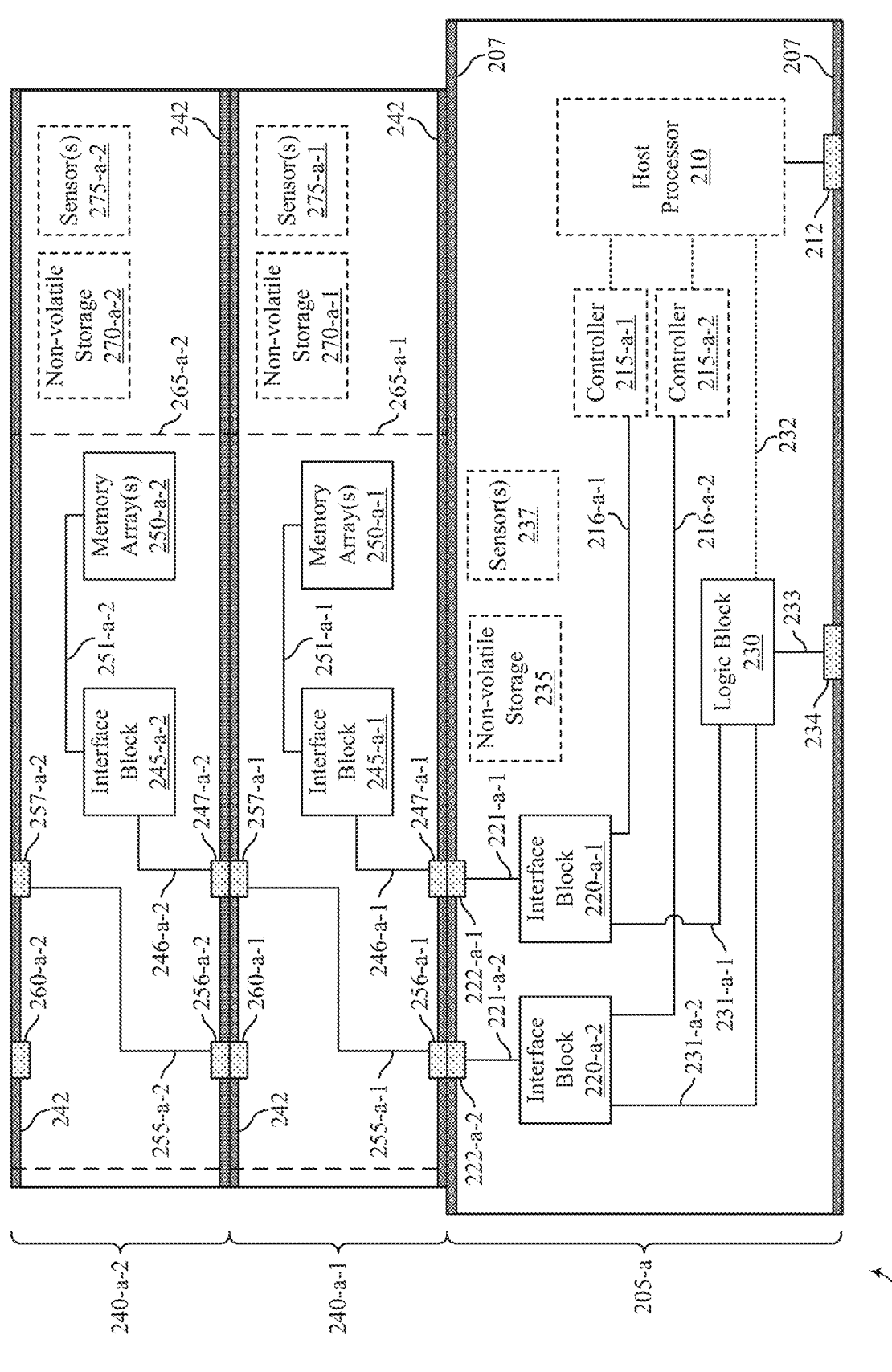
FIG. 2 shows an example of a system that supports management command techniques for stacked memory architectures in accordance with examples as disclosed herein.

FIG. 2 shows an example of a system 200 (e.g., a semiconductor system, a system of coupled semiconductor dies, a 3D stacked memory system) that supports management command techniques for stacked memory architectures in accordance with examples as disclosed herein. The system 200 illustrates an example of a die 205 (e.g., a die 205-a, a semiconductor die, a logic die, a processor die, a host die) that is coupled with one or more dies 240 (e.g., dies 240-a-1 and 240-a-2, semiconductor dies, memory dies, array dies). A die 205 or a die 240 may be formed using a respective semiconductor substrate (e.g., a substrate of crystalline semiconductor material such as silicon, germanium, silicon-germanium, gallium arsenide, or gallium nitride), or a silicon-on-insulator (SOI) substrate (e.g., silicon-on-glass (SOG), silicon-on-sapphire (SOS)), or epitaxial semiconductor materials formed on another substrate, among other examples. Although the illustrated example of a system 200 includes two dies 240, a system 200 in accordance with the described techniques may include any quantity of one or more dies 240 coupled with a die 205, among other dies of a stack or other coupled layout. Further, although non-limiting examples of the system 200 herein are generally described in terms of applicability to memory systems, memory sub-systems, memory devices, or a combination thereof, examples of the system 200 are not so limited. For example, aspects of the present disclosure may be applied as well to any computing system, computing sub-system, processing system, processing sub-system, component, device, structure, or other types of systems or sub-systems used for applications such as data collecting, data processing, data storage, networking, communication, power, artificial intelligence, system-on-a-chip, control, telemetry, sensing and monitoring, digital entertainment, or any combination thereof.

The system 200 illustrates an example of interface circuitry between a host and memory (e.g., via a host interface, via a physical host interface) that is implemented in (e.g., divided between) multiple semiconductor dies (e.g., a stack of directly-coupled dies). For example, the die 205-*a* may include a set of one or more interface blocks 220 (e.g., interface blocks 220-*a*-1 and 220-*a*-2, memory interface blocks), and each die 240 may include a set of one or more interface blocks 245 (e.g., access interface blocks) and one or more memory arrays 250 (e.g., die 240-*a*-1 including an interface block 245-*a*-1 coupled with a set of one or more memory arrays 250-*a*-1, die 240-*a*-2 including an interface block 245-*a*-2 coupled with a set of one or more memory arrays 250-*a*-2). The memory arrays 250 may be examples of memory arrays 170, and may include memory cells of various architectures, such as RAM, DRAM, SDRAM, SRAM, FeRAM, MRAM, RRAM, PCM, chalcogenide, NOR, or NAND memory cells, or any combination thereof.

Although the example of system 200 is illustrated with one interface block 245 included in each die 240, a die 240 in accordance with the described techniques may include any quantity of one or more interface blocks 245, each coupled with a respective set of one or more memory arrays 250, and each coupled with a respective interface block 220 of a die 205. Thus, the interface circuitry of a system 200 may include one or more interface blocks 220 of a die 205, with each interface block 220 being coupled with (e.g., in communication with) a corresponding interface block 245 of a die 240 (e.g., external to the die 205). In some examples, a coupled combination of an interface block 220 and an interface block 245 (e.g., coupled via a bus associated with one or more channels, such as one or more data channels, one or more control channels, one or more clock channels, one or more pseudo-channels, or a combination thereof) may include or be referred to as a data path associated with a respective set of one or more memory arrays 250.

In some implementations, a die 205 may include a host processor 210. A host processor 210 may be an example of a host system 105, or a portion thereof (e.g., a processor 125, aspects of an external memory controller 120, or both). The host processor 210 may be configured to perform operations that implement storage of the memory arrays 250 (e.g., to support an application or other function of a host system 105, which may request access of the memory arrays 250). For example, the host processor 210 may receive data read from the memory arrays 250, or may transmit data to be written to the memory arrays 250, or both (e.g., in accordance with an application or other operations of the host processor 210). Additionally, or alternatively, a host processor 210 may be external to a die 205, such as in another semiconductor die or other component that is coupled with (e.g., communicatively coupled with, directly coupled with, bonded with, coupled via another intervening component) the die 205 via one or more contacts 212 (e.g., externally-accessible terminals of the system 200).

A host processor 210 may be configured to communicate (e.g., transmit, receive) signaling with the interface blocks 220 via one or more host interfaces 216 (e.g., physical host interfaces), which may implement aspects of channels 115 described with reference to FIG. 1. In some examples, host interfaces 216 may provide a communicative coupling between physical or functional boundaries of a host system 105 and a memory system 110. For example, the host processor 210 may be configured to transmit access signaling (e.g., control signaling, access command signaling, configuration signaling) via one or more host interfaces 216, which may be received by the interface blocks 220 to support access operations (e.g., read operations, write operations) on the memory arrays 250, among other operations. In some examples, a host interface 216 may include a respective set of one or more signal paths for each interface block 220, such that the host processor 210 may communicate with each interface block 220 via its corresponding set of signal paths (e.g., in accordance with a selection of the corresponding set to perform access operations via an interface block 220 that is selected by the host processor 210). Additionally, or alternatively, a host interface 216 may include one or more signal paths that are shared among multiple interface blocks 220 (not shown), and an interface block 220, or a host processor 210, or both may interpret, ignore, respond to, or inhibit response to signaling via shared signal paths of the host interface 216 based on a logical indication (e.g., an addressing indication associated with the interface block 220, an interface enable signal, or an interface select signal, which may be provided by the host processor 210 or the corresponding interface block 220, depending on signaling direction).

In some examples, a respective host interface 216 may be coupled between a set of one or more interface blocks 220 and a respective controller 215 (e.g., host interface 216-*a*-1 coupled between interface block 220-*a*-1 and controller 215-*a*-1, host interface 216-*a*-2 coupled between interface block 220-*a*-2 and controller 215-*a*-2, host interface controllers, host memory controllers). Each controller 215 (e.g., controllers 215-*a*-1 and 215-*a*-2) may be an example of control circuitry (e.g., memory controller circuitry, host interface control circuitry) associated with a host system 105, and may be associated with implementing respective instances of one or more aspects of an external memory controller 120, or of a memory system controller 155, or a combination thereof. A controller 215 and one or more corresponding interface blocks 220 may communicate (e.g., collaborate) to perform one or more operations (e.g., scheduling operations, access operations, operations initiated by a host processor 210) associated with accessing a corresponding set of one or more memory arrays 250. For example, each controller 215 (e.g., controllers 215-*a*-1 and 215-*a*-2) may be operable to respond to indications (e.g., requests, commands) from the host processor 210 to access one or more memory arrays 250 in support of a function or application of the host processor 210, to transmit associated commands to one or more interface blocks 220 to access the one or more memory arrays 250, and to communicate data (e.g., write data, read data) with the host processor 210, among other functions.

In some examples, one or more controllers 215 (e.g., controllers 215-*a*-1 and 215-*a*-2) may be implemented in a die 205 (e.g., the same die that includes one or more interface blocks 220) whether a host processor 210 is included in the die 205, or is external to the die 205, and an interface block 220 may communicate with the host processor 210 via one or more controllers 215. In some other examples, controllers 215 or associated circuitry or functionality may be implemented external to a die 205 (e.g., in another die, not shown, coupled with respective interface blocks 220 via respective terminals for each of the respective host interfaces 216), which may be in the same die as or a different die from a die that includes a host processor 210. In some other examples, aspects of one or more controllers 215 may be included in the host processor 210 (e.g., as a memory interface of the processor 210, as a memory interface of a host system 105).

Although the example of system 200 is illustrated as including a controller 215 for each interface block 220 (e.g., controller 215-*a*-1 for interface block 220-*a*-1, controller 215-*a*-2 for interface block 220-*a*-2), in various examples, a controller 215 may be coupled with any quantity of one or more interface blocks 220. Additionally, or alternatively, a given interface block 220 may be operable based on a single controller 215, or by one or more of a set of multiple controllers 215 (e.g., in accordance with a controller multiplexing scheme). In some examples, a controller 215, or a host interface 216, or both may be associated with a "channel set" that corresponds to multiple memory arrays 250. For example, such a channel set may be associated with multiple memory arrays 250 accessed via a single interface block 245, or multiple memory arrays 250 each accessed via a respective one of the interface blocks 245, or multiple memory arrays 250 each accessed via a respective one of the interface blocks 220, any of which may be associated with signaling via a single host interface 216 or a single controller 215. These and other configurations for implementing a channel sets may support various techniques for parallelism and high bandwidth data transfer, memory management operations, repair and replacement techniques, power and thermal distribution, among other techniques that leverage the described coupling of components and interfaces among multiple semiconductor dies (e.g., in accordance with the closely-coupled configuration of the system 200).

In some examples, a host processor 210 may determine to access an address (e.g., a logical address of a memory array 250, a physical address of a memory array 250, an address of an interface block 220, an address of a host interface 216, in response to an application of or supported by the host processor 210), and determine which controller 215 to transmit access signaling to for accessing the address (e.g., a controller 215 or interface block 220 corresponding to the address). In some examples, the address may be associated with a row of memory cells of the memory array 250, a column of memory cells of the memory array 250, or both. The host processor 210 may transmit access signaling (e.g., one or more access signals, one or more access commands) to the determined controller 215 and, in turn, the determined controller 215 may transmit access signaling to the corresponding interface block 220. The corresponding interface block 220 may subsequently transmit access signaling to the coupled interface block 245 to access the determined address (e.g., of a corresponding memory array 250).

A die 205 may also include a logic block 230 (e.g., a shared logic block, a central logic block, common logic circuitry, configuration circuitry, management circuitry, evaluation circuitry), which may be configured to communicate (e.g., transmit, receive) signaling with at least the interface blocks 220 of the die 205. In some cases, a logic block 230 may be configured to communicate information (e.g., commands, instructions, indications, data) with one or more interface blocks 220 to facilitate operations of the system 200. For example, a logic block 230 may be configured to transmit configuration signaling (e.g., initialization signaling, evaluation signaling, mapping signaling), which may be received by interface blocks 220 to support configuration of the interface blocks 220 or other aspects of operating the dies 240 (e.g., via the respective interface blocks 245). A logic block 230 may be coupled with each interface block 220 via a respective bus 231 (e.g., bus 231-*a*-1 associated with the interface block 220-*a*-1, bus 231-*a*-2 associated with the interface block 220-*a*-2). In some examples, respective buses 231 may each include a respective set of one or more signal paths, such that a logic block 230 may communicate with each interface block 220 via the respective set of signal paths. Additionally, or alternatively, respective buses 231 may include one or more signal paths that are shared among multiple interface blocks 220 (not shown).

In some implementations, a logic block 230 may be configured to communicate (e.g., transmit, receive) signaling with a host processor 210 (e.g., via a bus 232, via a contact 212 for a host processor 210 external to a die 205) such that the logic block 230 may support an interface between the interface blocks 220 and the host processor 210. For example, a host processor 210 may be configured to transmit initialization signaling (e.g., boot commands), or other configuration or operational signaling, which may be received by a logic block 230 to support initialization, configuration, evaluation, or other operations of the interface blocks 220. Additionally, or alternatively, in some implementations, a logic block 230 may be configured to communicate (e.g., transmit, receive) signaling with a component outside the system 200 via a bus 233 (e.g., and via a contact 234, which may be an externally-accessible terminal), such that the logic block 230 may support an interface that bypasses a host processor 210. Additionally, or alternatively, a logic block 230 may communicate with a host processor 210, and may communicate with one or more memory arrays 250 of one or more dies 240 (e.g., to perform self-test operations for access of memory arrays 250). In some examples, such implementations may support evaluations, configurations, or other operations of the system 200, via one or more contacts 234 that are accessible at a physical interface of the system, during manufacturing, assembly, validation, or other operation associated with the system 200 (e.g., before coupling with a host processor 210, without implementing a host processor 210, for operations independent of a host processor). Additionally, or alternatively, a logic block 230 may implement one or more aspects of a controller 215. For example, a logic block 230 may include or operate as one or more controllers 215 and may perform operations ascribed to a controller 215.

Each interface block 220 may be coupled with at least a respective bus 221 of the die 205, and a respective bus 246 of a die 240, that are configured to communicate signaling with a corresponding interface block 245 (e.g., via one or more associated signal paths). For example, the interface block 220-*a*-1 may be coupled with the interface block 245-*a*-1 via a bus 221-*a*-1 and a bus 246-*a*-1, and the interface block 220-*a*-2 may be coupled with the interface block 245-*a*-2 via a bus 221-*a*-2 and a bus 246-*a*-2. In some examples, a die 240 may include a bus that bypasses operational circuitry of the die 240 (e.g., that bypasses interface blocks 245 of a given die 240), such as a bus 255. For example, the interface block 220-*a*-2 may be coupled with the interface block 245-*a*-2 of the die 240-*a*-2 via a bus 255-*a*-1 of the die 240-*a*-1, which may bypass interface blocks 245 of the die 240-*a*-1. Such techniques may be extended for interconnection among more than two dies 240 (e.g., for interconnection via a respective bus 255 of multiple dies 240).

The respective signal paths of buses 221, 246, and 255 may be coupled with one another, from one die to another, via various arrangements of contacts at the surfaces of interfacing dies (e.g., exposed contacts, metal surfaces of the respective dies). For example, the bus 221-*a*-1 may be coupled with the bus 246-*a*-1 via a contact 222-*a*-1 of (e.g., at a surface of) the die 205-*a* and a contact 247-*a*-1 of the die 240-*a*-1, the bus 221-*a*-2 may be coupled with the bus 255-*a*-1 via a contact 222-*a*-2 of the die 205-*a* and a contact 256-*a*-1 of the die 240-*a*-1, the bus 255-*a*-1 may be coupled with the bus 246-*a*-2 via a contact 257-*a*-1 of the die 240-*a*-1 and a contact 247-*a*-2 of the die 240-*a*-2, and so on. Although each respective bus is illustrated with a single line, coupled via singular contacts, it is to be understood that each signal path of a given bus may be associated with respective contacts to support a separate communicative coupling via each signal path of the given bus. In some examples, a bus 255 may traverse a portion of a die 240 (e.g., in an in-plane direction, along a direction different from a thickness direction, in a waterfall arrangement, in a staircase arrangement), which may support an arrangement of contacts 222 along a surface of a die 205, among other contacts, being coupled with interface blocks 245 of different dies 240 along a stack direction (e.g., via respective contacts 256 and 257 that are non-overlapping when viewed along a thickness direction).

The interconnection of interfacing contacts may be supported by various techniques. For example, in a hybrid bonding implementation, interfacing contacts may be coupled by a fusion of conductive materials (e.g., electrically conductive materials) of the interfacing contacts (e.g., without solder or other intervening material between contacts). For example, in an assembled condition, the coupling of the die 205-*a* with the die 240-*a*-1 may include a conductive material of the contact 222-*a*-2 being fused with a conductive material of the contact 256-*a*-1, and the coupling of the die 240-*a*-1 with the die 240-*a*-2 may include a conductive material of the contact 257-*a*-1 being fused with a conductive material of the contact 247-*a*-2, and so on. In some examples, such coupling may include an inoperative fusion of contacts (e.g., a non-communicative coupling, a physical coupling), such as a fusion of the contact 260-*a*-1 with the contact 256-*a*-2, neither of which are coupled with operative circuitry of the dies 240-*a*-1 or 240-*a*-2. In some examples, such techniques may be implemented to improve coupling strength or uniformity (e.g., implementing contacts 260, which may not be operatively coupled with an interface block 245 or an interface block 220), or such a coupling may be a byproduct of a repetition of components that, in various configurations, may be operative or inoperative. (e.g., where, for dies 240 with a common arrangement of contacts 256 and 257, contacts 256-*a*-1 and 257-*a*-1 provide a communicative path between the interface block 245-*a*-2 and the interface block 220-*a*-2, but the contacts 256-*a*-2 and 257-*a*-2 do not provide a communicative path between an interface block 245 and an interface block 220).

In some examples, a fusion of conductive materials between dies (e.g., between contacts) may be accompanied by a fusion of other materials at one or more surfaces of the interfacing dies. For example, in an assembled condition, the coupling of the die 205-*a* with the die 240-*a*-1 may include a dielectric material 207 (e.g., an electrically non-conductive material) of the die 205-*a* being fused with a dielectric material 242 of the die 240-*a*-1, and the coupling of the die 240-*a*-1 with the die 240-*a*-2 may include a dielectric material 242 of the die 240-*a*-1 being fused with a dielectric material 242 of the die 240-*a*-2. In some examples, such dielectric materials may include an oxide, a nitride, a carbide, an oxide-nitride, an oxide-carbide, or other conversion or doping of a substrate material (e.g., a semiconductor substrate material) of the die 205 or dies 240, among other materials that may support such fusion. However, coupling among dies 205 and dies 240 may be implemented in accordance with other techniques, which may implement solder, adhesives, thermal interface materials, and other intervening materials.

In some examples, dies 240 may be coupled in a stack (e.g., forming a "cube" or other arrangement of dies 240), and one or more of such stacks may subsequently be coupled with a die 205. In some examples, respective set(s) of one or more dies 240 may be coupled with each die 205 of multiple dies 205 as formed in a wafer (e.g., in a chip-to-wafer bonding arrangement, before cutting the wafer of dies 205), and the dies 205 of the wafer, each coupled with their respective set(s) of dies 240, may be separated from one another (e.g., by cutting at least the wafer of dies 205). In some other examples, respective set(s) of one or more dies 240 may be coupled with a respective die 205 after the die 205 is separated from a wafer of dies 205 (e.g., in a chip-to-chip bonding arrangement). In some other examples, a respective set of one or more wafers each including multiple dies 240 may be coupled in a stack (e.g., in a wafer-to-wafer bonding arrangement). In various examples, such techniques may be followed by separating stacks of dies 240 from the coupled wafers, or the stack of wafers having dies 240 may be coupled with another wafer including multiple dies 205 (e.g., in a second wafer-to-wafer bonding arrangement), which may be followed by separating systems 200 from the coupled wafers. In some other examples, wafer-to-wafer coupling techniques may be implemented by stacking one or more wafers of dies 240 (e.g., sequentially) over a wafer of dies 205 before separation into systems 200, among other examples for forming systems 200.

The buses 221, 246, and 255 may be implemented to provide a configured signaling (e.g., a coordinated signaling, a logical signaling, modulated signaling, digital signaling) between an interface block 220 and a corresponding interface block 245, which may involve various modulation or encoding techniques by a transmitting interface block (e.g., via a driver component of the transmitting interface block). In some examples, such signaling may be supported by (e.g., accompanied by) clock signaling communicated via the respective buses (e.g., in coordination with signal transmission). For example, the buses may be configured to convey one or more clock signals transmitted by the interface block 220 for reception by the interface block 245 (e.g., to trigger signal reception by a latch or other reception component of the interface block 245, to support clocked operations of the interface block 245). Additionally, or alternatively, the buses may be configured to convey one or more clock signals transmitted by the interface block 245 for reception by the interface block 220 (e.g., to trigger signal reception by a latch or other reception component of the interface block 220, to support clocked operations of the interface block 220). Such clock signals may be associated with the communication (e.g., unidirectional communication, bidirectional communication, deterministic communication) of various signaling, such as control signaling, command signaling, data signaling, or any combination thereof. For example, the buses may include one or more signal paths for communications of a data bus (e.g., one or more data channels, a DQ bus, via a data interface of the interface blocks) in accordance with one or more corresponding clock signals (e.g., data clock signals), or one or more signal paths for communications of a control bus (e.g., a command/address (C/A) bus, via a command interface of the interface blocks) in accordance with one or more clock signals (e.g., control clock signals), or any combination thereof.

Interface blocks 220, interface blocks 245, and logic block 230 each may include circuitry (signaling circuitry, multiplexing circuitry, processing circuitry, controller circuitry, logic circuitry, physical components, hardware) in various configurations (e.g., hardware configurations, logic configurations, software or instruction configurations) that support the functionality allocated to the respective block for accessing or otherwise operating a corresponding set of memory arrays 250. For example, interface blocks 220 may include circuitry configured to perform a first subset of operations that support access of the memory arrays 250, and interface blocks 245 may include circuitry configured to perform a second subset of operations that support access of the memory arrays 250. In some examples, the interface blocks 220 and 245 may support a functional split or distribution of functionality associated with a memory system controller 155, a local memory controller 165, or both across multiple dies (e.g., a die 205 and at least one die 240). In some implementations, a logic block 230 may be configured to coordinate or configure aspects of the operations of the interface blocks 220, of the interface blocks 245, or both, and may support implementing one or more aspects of a memory system controller 155. Such operations, or subsets of operations, may include operations performed in response to commands from the host processor 210 or a controller 215, or operations performed without commands from a host processor 210 or a controller 215 (e.g., operations determined by or initiated by an interface block 220, operations determined by or initiated by an interface block 245, operations determined by or initiated by a logic block 230), or various combinations thereof.

In some implementations, the system 200 may include one or more instances of non-volatile storage (e.g., non-volatile storage 235 of a die 205, non-volatile storage 270 of one or more dies 240, or a combination thereof). In some examples, a logic block 230, interface blocks 220, interface blocks 245, or a combination thereof may be configured to communicate signaling with one or more instances of non-volatile storage. For example, a logic block 230, interface blocks 220, or interface blocks 245 may be coupled with one or more instances of non-volatile storage via one or more buses (not shown), or respective contacts (not shown), where applicable, which may each include one or more signal paths operable to communicate signaling (e.g., command signaling, data signaling). In some examples, a logic block 230, one or more interface blocks 220, one or more interface blocks 245, or a combination thereof may configure one or more operations based on information (e.g., instructions, configurations, parameters) stored in one or more instances of non-volatile storage. Additionally, or alternatively, in some examples, a logic block 230, one or more interface blocks 220, one or more interface blocks 245, or a combination thereof may write information (e.g., configuration information, evaluation information) to be stored in one or more instances of non-volatile storage. In some examples, such non-volatile storage may include fuses, antifuses, or other types of one-time programmable storage elements, or any combination thereof.

In some implementations, the system 200 may include one or more sensors (e.g., one or more sensors 237 of a die 205, one or more sensors 275 of one or more dies 240, or a combination thereof). In some implementations, a logic block 230, interface blocks 220, interface blocks 245, or a combination thereof may be configured to receive one or more indications based on measurements of one or more sensors of the system 200. For example, a logic block 230, interface blocks 220, or interface blocks 245 may be coupled with one or more sensors via one or more buses (not shown), or respective contacts (not shown). Such sensors may include temperature sensors, current sensors, voltage sensors, counters, and other types of sensors. In some examples, a logic block 230, one or more interface blocks 220, one or more interface blocks 245, or a combination thereof may configure one or more operations based on output of the one or more sensors. For example, a logic block 230 may configure one or more operations of interface blocks 220 based on signaling (e.g., indications, data) received from the one or more sensors. Additionally, or alternatively, an interface block 220 may generate access signaling for transmitting to a corresponding interface block 245 based on one or more sensors.

In some examples, circuitry of interface blocks 220, interface blocks 245, or a logic block 230, or any combination thereof may include components (e.g., transistors) formed at least in part from doped portions of a substrate of the respective die. In some examples, a substrate of a die 205 may have characteristics (e.g., materials, material characteristics, physical shapes or dimensions) that are different from those of a substrate of a die 240. Additionally, or alternatively, in some examples, transistors formed from a substrate of a die 205 may have characteristics (e.g., manufacturing characteristics, performance characteristics, physical shapes or dimensions) that are different from transistors formed from a substrate of a die 240 (e.g., in accordance with different transistor architectures, in accordance with different transistor designs).

In some examples, the interface blocks 220 may support a layout for one or more components within the 220. For example, the layout may include pairing components to share an access port (e.g., a command port, a data port). Further, in some examples, the layout may support interfaces for a controller 215 (e.g., a host interface 216) that are different from interfaces for an interface block 245 (e.g., via the buses 221). For instance, a host interface 216 may be synchronous and have separate channels for read and write operations, while an interface between an interface block 220 and one or more interface blocks 245 may be asynchronous and support both read and write operations with the same channel. In some examples, signaling of a host interface 216 may be implemented with a deterministic timing (e.g., deterministic between a controller 215 and one or more interface blocks 220), which may be associated with a configured timing between a first signal and a responsive second signal. In some examples, signaling between an interface block 220 and one or more interface blocks 245 may be implemented with a timing that is different from timing of a host interface 216 (e.g., in accordance with a different clock frequency, in accordance with a timing offset, such as a phase offset), which may be deterministic or non-deterministic.

A die 240 may include one or more units 265 (e.g., modules) that are separated from a semiconductor wafer having a pattern (e.g., a two-dimensional pattern) of units 265. Although each die 240 of the system 200 is illustrated with a single unit 265 (e.g., unit 265-a-1 of die 240-a-1, unit 265-a-2 of die 240-a-2), a die 240 in accordance with the described techniques may include any quantity of units 265, which may be arranged in various patterns (e.g., sets of one or more units 265 along a row direction, sets of one or more units 265 along a column direction, among other patterns). Each unit 265 may include at least the circuitry of a respective interface block 245, along with memory array(s) 250, a bus 251, a bus 246, and one or more contacts 247 corresponding to the respective interface block 245. In some examples, where applicable, each unit 265 may also include one or more buses 255, contacts 256, contacts 257, or contacts 260 (e.g., associated with a respective interface block 245 of a unit 265 of a different die 240), which may support various degrees of stackability or modularity among or via units 265 of other dies 240. Although examples of non-volatile storage 270 and sensors 275 are illustrated outside units 265, in some other examples, non-volatile storage 270, sensors 275, or both may additionally, or alternatively, be included in units 265.

In some examples, the interface blocks 220 may include circuitry configured to receive first access command signaling from a host processor 210 or a controller 215 (e.g., via a host interface 216, via one or more contacts 212 from a host processor 210 or controller 215 external to a die 205, based on a request from a host application), and to transmit second access command signaling to the respective (e.g., coupled) interface block 245 based on (e.g., in response to) the received first access command signaling. The interface blocks 245 may accordingly include circuitry configured to receive the second access command signaling from the respective interface block 220 and, in some examples, to access a respective set of one or more memory arrays 250 based on (e.g., in response to) the received second access command signaling. In various examples, the first access command signaling may include access commands that are associated with a type of operation (e.g., a read operation, a write operation, a refresh operation, a memory management operation), which may be associated with an indication of an address of the one or more memory arrays 250 (e.g., a logical address, a physical address). In some examples, the first access command signaling may include an indication of a logical address associated with the memory arrays 250, and circuitry of an interface block 220 may be configured to generate the second access command signaling to indicate a physical address associated with the memory arrays 250 (e.g., a row address, a column address, using a logical-to-physical (L2P) table or other mapping or calculation functionality of the interface block 220).

In some examples, to support write operations of the system 200, circuitry of the interface blocks 220 may be configured to receive (e.g., from a host processor 210, from a controller 215, via a host interface 216, via one or more contacts 212 from a host processor 210 or controller 215 external to a die 205) first data signaling associated with the first access command signaling, and to transmit second data signaling (e.g., associated with second access command signaling) based on received first access command signaling and first data signaling. The interface blocks 245 may accordingly be configured to receive second data signaling, and to write data to one or more memory arrays 250 (e.g., in accordance with an indicated address associated with the first access command signaling) based on the received second access command signaling and second data signaling. In some examples, the interface blocks 220 may include an error control functionality (e.g., error detection circuitry, error correction circuitry, error correction code (ECC) logic, an ECC engine) that supports the interface blocks 220 generating the second data signaling based on performing an error control operation using the received first data signaling (e.g., detecting or correcting an error in the first data signaling, determining one or more parity bits to be conveyed in the second data signaling and written with the data).

In some examples, to support read operations of the system 200, circuitry of the interface blocks 245 may be configured to read data from the memory arrays 250 based on received second access command signaling, and to transmit first data signaling based on the read data. The interface blocks 220 may accordingly be configured to receive first data signaling, and to transmit second data signaling (e.g., to a host processor 210, to a controller 215, via a host interface 216, via one or more contacts 212 to a host processor 210 or controller 215 external to a die 205) based on the received first data signaling. In some examples, the interface blocks 220 may include an error control functionality that supports the interface blocks 220 generating the second data signaling based on performing an error control operation using the received first data signaling (e.g., detecting or correcting an error in the first data signaling, which may include a calculation involving one or more parity bits received with the first data signaling).

In some examples, access command signaling that is transmitted by the interface blocks 220 to the interface blocks 245, among other signaling, may be generated (e.g., based on access command signaling received from a host processor 210, based on initiation signaling received from a host processor 210, without receiving or otherwise independent from signaling from a host processor 210) in accordance with various determination or generation techniques configured at the interface blocks 220 (e.g., based on a configuration for accessing memory arrays 250 that is modified at the interface blocks 220). In some examples, such techniques may involve signaling or other coordination with a logic block 230, a host processor 210, one or more controllers 215, one or more instances of non-volatile storage, one or more sensors, or any combination thereof. Such techniques may support the interface blocks 220 configuring aspects of the access operations performed on the memory arrays 250 by a respective interface block 245, among other operations. For example, interface blocks 220 may include evaluation circuitry, access configuration circuitry, signaling circuitry, scheduling circuitry, repair circuitry, refresh circuitry, error control circuitry, adverse access (e.g., row hammer) mitigation circuitry, and other circuitry operable to configure operations associated with one or more dies (e.g., operations associated with accessing memory arrays 250 of the dies 240).

A system 200 may be configured to perform management operations to support or maintain operating characteristics, such as performance characteristics associated with operating one or more memory arrays 250. To support such techniques in accordance with examples as disclosed herein, a system 200 may be configured to support management command signaling between controllers 215 and interface blocks 220. For example, the interface blocks 220 may be configured to schedule or otherwise determine that a management operation is to be performed, and may indicate (e.g., signal) a request to a controller 215 to schedule aspects of the management operation. In response, the controller 215 may indicate one or more commands to the interface block 220 to perform the management operation.

The described techniques for management operations may support various improvements to operations of the system 200. For example, by providing such an indication of a management operation as a request to schedule aspects of the management operation (e.g., as a flexible request, as a request that may not be associated with an immediate response), a controller 215, a host processor 210, or a combination thereof may be enabled to coordinate management operations with other operations (e.g., operations to support a function or application of or using the host processor 210), such as access operations on one or more memory arrays 250. Such techniques may allow the controller 215 or host processor 210 to prioritize relatively higher-priority access operations over or in parallel with the requested management operations, which may include delaying management operations, using a different controller 215 to support access operations (e.g., selecting an available controller 215, an available host interface 216, or an available interface block 220, or a combination thereof that is not associated with requested management operations), among other scheduling or prioritization.

In some examples, such a request may include an indication of a duration within which a management operation is to be performed, such as a quantity of cycles (e.g., computation cycles, clock cycles, system cycles) between signaling of a management operation request and an initiation or a completion of the management operation. Such techniques may support management operation commands being scheduled by the controller 215 to be within a threshold duration that supports the system 200 meeting a desired operating characteristic (e.g., in support of a performance requirement associated with accessing the memory arrays 250).

In some examples, a management operation may be associated with a set (e.g., a sequence) of multiple operations (e.g., sub-operations, DRAM operations), such that a single request indication by an interface block 220 may be responded to by a controller 215 with indication (e.g., multiple indications, a sequence of indications, a compound command) of a set of commands in a manner that reduces request or command signaling (e.g., from the interface block 220 to the controller 215). In some implementations, such techniques may leverage an existing command set (e.g., a set of commands in accordance with a standardized interface protocol, a set of DRAM commands). For example, a first management operation may be associated with a first sequence of one or more DRAM commands, or timing thereof, or both (e.g., in accordance with a first request identifier), and a second management operation may be associated with a second sequence of one or more DRAM commands, or timing thereof, or both (e.g., in accordance with a second request identifier). In some implementations, such associations between management operations and commands may be stored at the system (e.g., in non-volatile storage 235, or non-volatile storage 270, or a combination thereof), and may be signaled to the controllers 215 (e.g., in a boot sequence, in an initialization sequence, in a configuration sequence, over a host interface 216). For example, such associations may be programmed (e.g., as instructions, as configuration parameters, during manufacturing or configuration of a die 205 or a die 240) or updated (e.g., via a logic block 230, via contacts 234, by way of flashing instructions or parameters, before or after coupling the stack of dies), which may facilitate programming or updating such associations without involving other design coordination between interface blocks 220 and controllers 215 (e.g., without requiring an update to a specification of a host interface 216).

Additionally, or alternatively, criteria for performing management operations (e.g., selection criteria, determination criteria, scheduling criteria) may be stored at the system 200 (e.g., in non-volatile storage 235, or non-volatile storage 270, or a combination thereof), which may be withheld from controllers 215 and a host processor 210. For example, scheduling details or initiation criteria for performing management operations may be programmed (e.g., as instructions, as configuration parameters, as parameters based on indications from one or more sensors 237 or sensors 275) or updated (e.g., via a logic block 230, via contacts 234) without such information being shared with a provider (e.g., designer, manufacturer) of the host processor 210 or controllers 215, among other aspects of the system 200. In some examples, such techniques for storing criteria for performing management operations may obscure such techniques from being discovered.

Thus, in accordance with these and other techniques, a system 200 may be configured in a manner that supports relatively simplified specifications for a host interface 216 to support management operations for maintaining performance of the system 200, relatively simplified scheduling at a controller 215 to support such management operations, and relatively flexible designs of or modifications to memory system interface circuitry (e.g., interface blocks 220, logic blocks 230) to such support management operations, among other benefits. Such techniques may be particularly beneficial in a system of coupled semiconductor dies, including benefits to improve throughput, to improve prioritization of operations, and to reduce latency, among other benefits.

Figure 3:
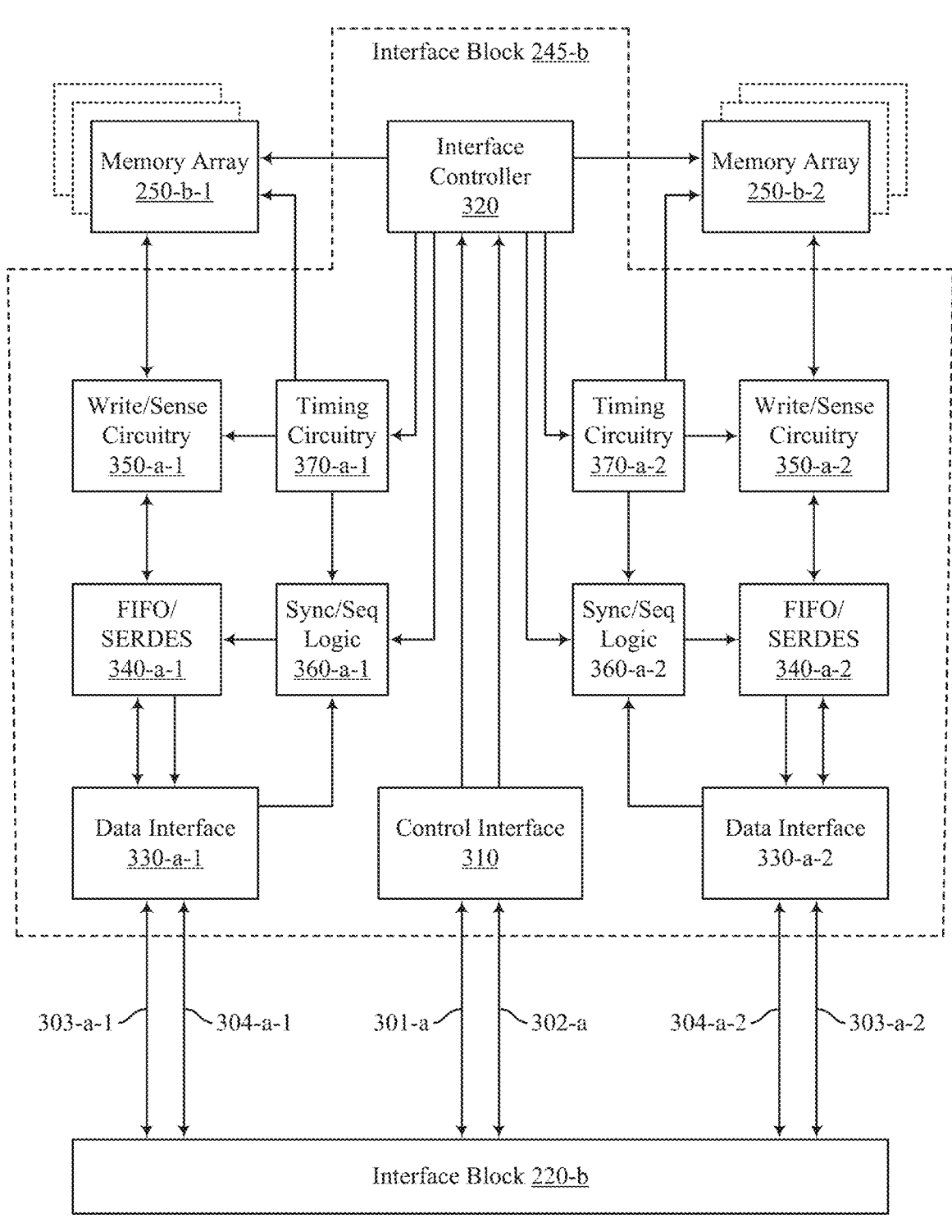
FIGS. 3 and 4 show examples of interface architectures that support management command techniques for stacked memory architectures in accordance with examples as disclosed herein.

FIG. 3 shows an example of an interface architecture 300 that supports management command techniques for stacked memory architectures in accordance with examples as disclosed herein. The interface architecture 300 illustrates an example of an interface block 245-b (e.g., of a die 240) coupled with an interface block 220-b (e.g., of a die 205). The interface block 245-b may be communicatively coupled with the interface block 220-b via one or more of a bus 301, a bus 302, a bus 303, and a bus 304, each of which may be examples of one or more signal paths of a bus 221 and a bus 246, as well as a bus 255, where applicable.

The interface block 245-b includes a control interface 310 (e.g., a command interface), which may be configured to communicate signaling with the interface block 220-b. For example, the control interface 310 may include circuitry (e.g., a receiver, one or more latches) configured to receive control signaling (e.g., modulated control signaling, access command signaling, configuration signaling, address signaling, such as row address signaling or column address signaling) via the bus 301-a. The control interface 310 also may include circuitry configured to receive clock signaling (e.g., clock signaling associated with the control interface 310, clock signaling having one or more phases, such as true and complement phases, dk_t/c signaling from the interface block 220-b) via the bus 302-a, which the control interface 310 may use for receiving the control signaling of the bus 301-a (e.g., for triggering the one or more latches). The control interface 310 may transmit (e.g., forward) the control signaling and the clock signaling (e.g., for timing of other operations of the interface block 245-b) to an interface controller 320.

The interface block 245-b also includes two data interfaces 330 (e.g., data interfaces 330-a-1 and 330-a-2), which also may be configured to communicate signaling with the interface block 220-b. Each data interface 330 may include corresponding buses and circuitry, the operation of which may be associated with (e.g., controlled by, coordinated with, operated based on) control signaling via the control interface 310. Although the example of interface block 245-b includes two data interfaces 330 associated with the control interface 310 (e.g., in a "channel pair" arrangement, in a "pseudo-channel pair" arrangement), the described techniques for an interface block 245 may include any quantity of one or more data interfaces 330, and associated buses and circuitry, for a given control interface 310 of the interface block 245.

Each data interface 330 may be associated with respective data path circuitry, which may include respective first-in-first-out (FIFO) and serialization/deserialization (SERDES) circuitry (e.g., FIFO/SERDES 340), respective write/sense circuitry 350, respective synchronization and sequencing circuitry (e.g., sync/seq logic 360), and respective timing circuitry 370, along with interconnecting signal paths (e.g., one or more buses). However, in some other examples, data path circuitry may be arranged in a different manner, or may include different circuitry components, which may include circuitry that is dedicated to respective data paths, or shared among data paths, or various combinations thereof. Each data interface 330 also may be associated with a respective set of one or more memory arrays 250. In some examples, each memory array 250 may be understood to include respective addressing circuitry such as bank logic or decoders (e.g., a row decoder, a column decoder), or memory cell sense amplifier circuitry, among other array circuitry. However, in some other examples, at least a portion of such circuitry may be included in an interface block 245.

Each data interface 330 may include circuitry (e.g., one or more latches, one or more drivers) configured to communicate (e.g., receive, transmit) data signaling (e.g., modulated data signaling, DQ signaling) via a respective bus 303. Each data interface 330 also may include circuitry to communicate clock signaling via a respective bus 304, which may support clock signal reception by the data interface 330 (e.g., first clock signaling associated with the data interface 330, clock signaling having one or more phases, such as true and complement phases, DQS_t/c signaling from the interface block 220-b, clock signaling associated with data reception or write operations), or clock signal transmission by the data interface 330 (e.g., second clock signaling associated with the data interface 330, RDQS_t/c signaling to the interface block 220-b, clock signaling associated with data transmission or read operations), or both. In some examples, a data interface 330, a bus 303, or a combination of a bus 303 and a bus 304, may be associated with a "pseudo-channel," and multiple pseudo-channels may be associated with the same control interface 310 or the same control bus (e.g., a bus 301, a combination of a bus 301 and a bus 302). In some implementations, pseudo-channels of multiple interface blocks 245 may be grouped together (e.g., functionally, logically, electrically, such as through hard-wired signal paths or multiplexing circuitry) to support a channel set (e.g., associated with a corresponding host interface 216). Each data interface 330 may transmit clock signaling (e.g., received clock signaling, DQS_t/c signaling) to sync/seq logic 360 via a respective bus (e.g., for timing of other operations of the interface block 245-b).

The interface controller 320 may support various functionality (e.g., control functionality, configuration functionality) of the interface block 245-b for accessing or otherwise managing operations of the coupled memory arrays 250. For example, the interface controller 320 may support access command coordination or configuration, latency or timing compensation, access command buffering (e.g., in accordance with a FIFO or other organizational scheme), mode registers or logic for configuration settings, or test functionality (e.g., evaluation functionality, BIST functionality), among other functions or combinations thereof. For each data path of the interface block 245 (e.g., associated with a respective data interface 330), the interface controller 320 may be configured to transmit signaling (e.g., address signaling, such as row address or row activation signaling) to the respective memory arrays 250 via a bus. For each data path of the interface block 245, the interface controller 320 may communicate signaling (e.g., timing signaling, which may be based on clock signaling received from the control interface 310, configuration signaling) with respective timing circuitry 370 and sync/seq logic 360 via respective buses.

For each data path, the respective timing circuitry 370 may support timing of various operations (e.g., activations, coupling operations, signal latching, signal driving) relative to timing signaling received from the interface controller 320. For example, timing circuitry 370 may include a timing chain (e.g., a global column timing chain) configured to generate one or more clock signals or other initiation signals for controlling operations of the respective data path, and such signaling may include transitions (e.g., rising edge transitions, falling edge transitions, on/off transitions) that are offset from, at a different rate from, or otherwise different from transitions of signaling from the interface controller 320 to support a given operation or combination of operations. For example, timing circuitry 370 may be configured to transmit signaling (e.g., address signaling, such as column address or column activation signaling) to the respective memory arrays 250, to transmit signaling to the respective write/sense circuitry 350 (e.g., latch or driver timing signaling), and to transmit signaling to the respective sync/seq logic (e.g., timing signaling).

For each data path, the respective FIFO/SERDES 340 may be configured to convert between data signaling of a first bus width (e.g., a relatively wide bus width, a data read/write (DRW) bus, a bus for communications with write/sense circuitry 350 having a relatively larger quantity of signal paths) and a second bus width (e.g., a relatively narrow bus width, a bus for communications with a data interface 330 having a relatively smaller quantity of signal paths). In some examples, such a conversion may be accompanied by changing a rate of signaling between signaling from the data interface 330 and the write/sense circuitry 350 (e.g., to maintain a given throughput). In various examples, the FIFO/SERDES 340 may receive data signaling from the data interface 330 and transmit data signaling to the write/sense circuitry 350 (e.g., to support a write operation), or may receive data signaling from the sense circuitry 350 and transmit data signaling to the data interface 330 (e.g., to support a read operation). In some examples (e.g., to support a read operation), the FIFO/SERDES 340 may be configured to transmit clock signaling (e.g., RDQS_t/c signaling) to the data interface 330, which may be forwarded to the interface block 220-b.

The timing or other synchronization of operations performed by the FIFO/SERDES 340 may be supported by one or more clock signals, among other signaling, received from the respective sync/seq logic 360. For example, the sync/seq logic 360 may generate or otherwise coordinate clock signaling to support the different rates of signaling of different buses (e.g., based on received clock signaling). Additionally, or alternatively, the FIFO/SERDES 340 may operate in a direction (e.g., for data transmission to a data interface 330, for data reception from a data interface 330) or other mode based on configuration signaling received from the sync/seq logic 360.

For each data path, the respective write/sense circuitry 350 may be configured to support the accessing (e.g., data signaling, write signaling, read signaling) of the respective set of one or more memory arrays 250. For example, the write/sense circuitry 350 may be coupled with the memory arrays 250 via a bus (e.g., a global input/output (GIO) bus), which may include respective signal paths associated with each memory array 250, or may include signal paths that are shared for all of the memory arrays 250 of the set, in which case the memory array circuitry may include multiplexing circuitry operable to couple the bus with a selected one of the memory arrays 250. In some examples, a bus between the write/sense circuitry 350 and the set of one or more memory arrays 250 may include a same quantity of signal paths as a bus between the write/sense circuitry 350 and the FIFO/SERDES 340 (e.g., for signaling GIO[287:0]) or a same quantity of signal paths as a quantity of columns in each memory array 250. In some other examples, the memory arrays 250 may include a quantity of columns that is an integer multiple of the quantity of signal paths of the bus, in which case the memory array circuitry (e.g., each memory array 250) may include decoding circuitry operable to couple a subset of columns of memory cells, or associated circuitry, with the bus.

To support write operations, the write/sense circuitry 350 may be configured to drive signaling that is operable to write one or more logic states to memory cells of the memory arrays 250 (e.g., based on received data, based on received timing signaling, based on data signaling received via a bus 303 and on control signaling received via a bus 301-*a*). In some examples, such signaling may be transmitted to supporting circuitry of or otherwise associated with the memory arrays 250 (e.g., as an output of signals corresponding to logic states to be written), such as sense amplifier circuitry, voltage sources, current sources, or other driver circuitry operable to apply a bias across a storage element of the memory cells (e.g., across a capacitor, across a ferroelectric capacitor), or apply a charge, a current, or other signaling to a storage element of the memory cells (e.g., to apply a current to a chalcogenide or other configurable memory material, to apply a charge to a gate of a NAND memory cell), among other examples.

To support read operations, the write/sense circuitry 350 may be configured to receive signaling that the write/sense circuitry 350 may further amplify for communication through the interface block 245-*b*. For example, the write/sense circuitry 350 may be configured to receive signaling corresponding to logic states read from the memory arrays 250, but at a relatively low driver strength (e.g., relatively 'analog' signaling, which may be associated with a relatively low drive strength of sense amplifiers of the memory arrays 250). The write/sense circuitry 350 may thus include further sense amplification (e.g., a data sense amplifier (DSA) between signal paths between the write/sense circuitry and the set of one or more memory arrays and respective signal paths between the write/sense circuitry and the FIFO/SERDES), which each may have a relatively high drive strength (e.g., for driving relatively 'digital' signaling).

The features of the interface architecture 300 may be duplicated in various quantities and arrangements to support a semiconductor system having multiple dies, such as various examples of a system 200. In an example implementation, each die 240 may be configured with 64 instances of the interface block 245-*b*, which may support a data signaling width of 9,216 signal paths for each die 240 (e.g., where each bus 303 of a channel pair is associated with 72 signal paths). For a system 200 having a stack of eight dies 240 coupled with a die 205, the die 205 may thus be configured with 512 instances of the interface block 220-*b*, thereby supporting an overall data signaling width of 73,738 signal paths for the system 200. However, in other implementations, dies 205 and dies 240 may be configured with different quantities of interface blocks 220 and 245, respectively, and a system 200 may be configured with different quantities of dies 240 per die 205.

Figure 4:
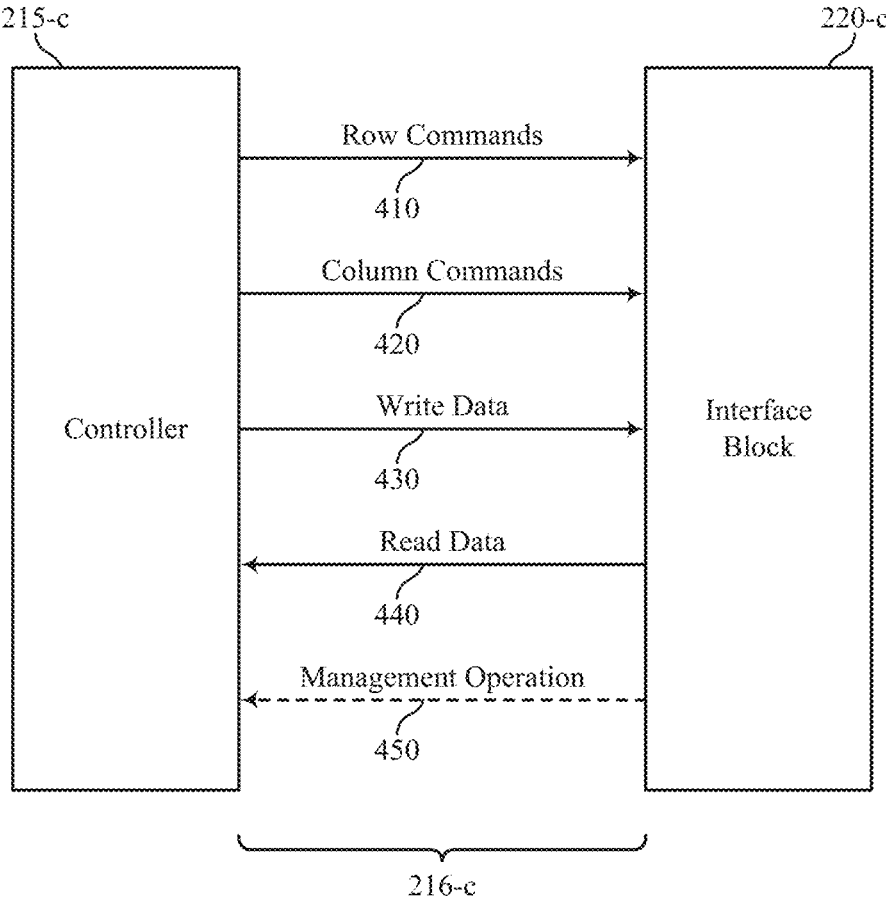

FIG. 4 shows an example of an interface architecture 400 that supports management command techniques for stacked memory architectures in accordance with examples as disclosed herein. The interface architecture 400 illustrates an example of an interface block 220-*c* (e.g., of a die 205) coupled with a controller 215-*c* (e.g., of the die 205, external to the die 205). In some examples, the controller 215-*c* may support operations of a host system 105, such as coordinating access operations in response to operations (e.g., indications, requests, commands) of a host application. The interface block 220-*c* may include logic (e.g., management logic, media management logic) configured for determining to perform management operations of a memory system 110, such as management operations to support operations associated with accessing memory arrays 250 (e.g., of one or more dies 240), and transmitting requests for such management operations to be scheduled (e.g., by the controller 215-*c*). In some examples, the interface block 220-*c* may be illustrative of a single-channel memory interface block, but the described techniques may be applicable to any quantity of channels or pseudo channels of a system 200.

The controller 215-*c* may be communicatively coupled with the interface block 220-*c* via one or more of a bus 410, a bus 420, a bus 430, a bus 440, and a bus 450, each of which may be examples of one or more signal paths of a host interface 216-*c*. For example, a bus 410 may be associated with one or more signal paths for conveying row command information from the controller 215-*c* to the interface block 220-*c*, such as respective or shared signal paths for conveying ACT commands and PRE commands with accompanying address information (e.g., channel information, pseudo-channel information, bank information, row information). The bus 420 may be associated with one or more signal paths for conveying column command information from the controller 215-*c* to the interface block 220-*c*, such as respective or shared signal paths for conveying RD commands, RDA commands, WR commands, and WRA commands with accompanying address information (e.g., column information). Although the bus 410 and the bus 420 are illustrated separately, a bus 410 and a bus 420 may, in some examples, be implemented in a common bus that supports conveying row command information and column command information via the same signal path(s). In some examples, signal paths of a bus 410, a bus 420, or both may have corresponding signal paths included in a bus 301 (e.g., between the interface block 220-*c* and an interface block 245). The bus 430 may be associated with one or more signal paths (e.g., 64 signal paths) for conveying write data from the controller 215-*c* to the interface block 220-*c*, and the bus 440 may be associated with one or more signal paths (e.g., 64 signal paths) for conveying read data from the interface block 220-*c* to the controller 215-*c*. Although the bus 430 and the bus 440 are illustrated separately (e.g., as unidirectional buses), a bus 430 and a bus 440 may, in some examples, be implemented in a common bus (e.g., a bidirectional bus) that supports conveying write data and read data via the same signal path(s).

The host interface 216-*c* may support a command interface (e.g., a deterministic interface) for indications such as activation commands, precharge commands, read commands, and write commands, among others, which may be configured to operate in accordance with configured (e.g., predetermined, published, deterministic) timings and responses (e.g., responsive operations, responsive signaling). For example, the controller 215-*c* may be configured to handle command scheduling, which may include a combination of scheduling commands for access operations to support a host application and scheduling commands to support management operations (e.g., requested by the interface block 220-*c*). In some implementations, such commands may be configured in accordance with a memory protocol (e.g., a DRAM protocol). For example, a set of commands that may be configured between the controller 215-*c* and the interface block 220-*c* (e.g., a command set supported over the host interface 216-*c*) may include an activate command (e.g., an ACT command), a precharge command (e.g., a PRE command), an row-no-operation (e.g., RNOP) command, a read command (e.g., an RD command), a read with auto-precharge command (e.g., an RDA command), a write command (e.g., a WR command), a write with auto-precharge command (e.g., a WRA command) command, or a column-no-operation command (e.g., a CNOP command), among others commands or combinations thereof. In some examples, such commands may be accompanied by one or more delay commands, which may be used to configure or request a delay (as a quantity of cycles) between other operations.

Table 1 illustrates an example of commands and associated identifiers that may be available for association with a given management operation:

TABLE 1

Example Commands for Management Operation Associations

| Command | ID |
|---------|-----|
| NOP | 0 |
| RNOP | 1 |
| ACT | 2 |
| PRE | 3 |
| CNOP | 4 |
| WR | 5 |
| WRA | 6 |
| RD | 7 |
| RDA | 8 |
| Wait 2c | 9 |
| Wait 4c | 10 |
| Wait 8c | 11 |
| Wait 16c | 12 |
| Wait 32c | 13 |
| Reserved | 14 |
| Reserved | 15 |

In some examples, such commands may be a configured set of possible commands known to a host system 105 (e.g., to the controller 215-c) and to a coupled memory system 110 (e.g., to the interface block 220-c) at the time of system design. In various examples, any one or more of such commands may be associated with a management operation (e.g., by command ID) that may be requested by the interface block 220-c and scheduled by the controller 215-c (e.g., as commands for a compound operation).

In some implementations, such commands may follow the same timing constraints (e.g., DRAM timing constraints) whether they are used to support a host application or a management operation. For example, the controller 215-c, the interface block 220-c, or both may also be configured with command timings in accordance with a memory protocol (e.g., a DRAM protocol), with may include configured timings such as a row-to-column delay for read operations (e.g., tRCDR), a row-to-column delay for write operations (e.g., tRCDW), a row precharge timing (e.g., tRP), a row active time (e.g., tRAS), a row cycle time (e.g., tRC), a row-to-row or RAS-to-RAS delay timing (e.g., tRRD), a write recovery time (e.g., tWR), a read-to-write delay timing (e.g., tRTW), a write-to-read delay timing (e.g., tWTR), a column-to-column delay timing (e.g., tCCD), among other timings or combinations thereof. Thus, with an understanding of configured commands and associated timings, the controller 215-c may be configured to schedule commands (e.g., in response to application requests, in response to management operation requests) that satisfy configured timing constraints in a manner that supports high performance of the associated host system 105, while also supporting management operations as determined by the associated memory system 110. By mapping management operations to known commands and timings, such techniques can be performed using a transparent interface with relatively fewer commands than if management operations were defined in accordance with new commands or timings.

The interface block 220-c may be configured to communicate a request to perform a management operation on one or more memory arrays 250 (e.g., a refresh operation, a row hammer mitigation operation, a scrubbing operation, a repair operation, a sparing operation, as determined by the interface block 220-c), which may be conveyed as a request for the controller 215 to schedule the interface block 220-c to perform the management operation. In some implementations, the host interface 216-c may be configured with a bus 450 (e.g., a bus dedicated to management operation requests, a unidirectional bus for signaling from the interface block 220-c to the controller 215-c), which may be associated with one or more signal paths that are dedicated to conveying management operation requests from the interface block 220-c to the controller 215-c. In some other implementations, such request signaling may be conveyed on a bus that is not dedicated to management operation requests, but is otherwise different from a bus for the interface block 220-c to receive commands from the controller 215-c (e.g., different from a bus 410 and a bus 420). In response to a management operation request, the controller 215-c, operating as a centralized scheduler, may schedule and transmit indications of one or more commands that are associated with the requested management operation, which may include a sequence of multiple commands (e.g., a combination of any one or more of an ACT command, a PRE command, an RNOP command, an RD command, an RDA command, a WR command, a WRA command, or a CNOP command) that are indicated in accordance with preconfigured timing constraints.

Figure 5:
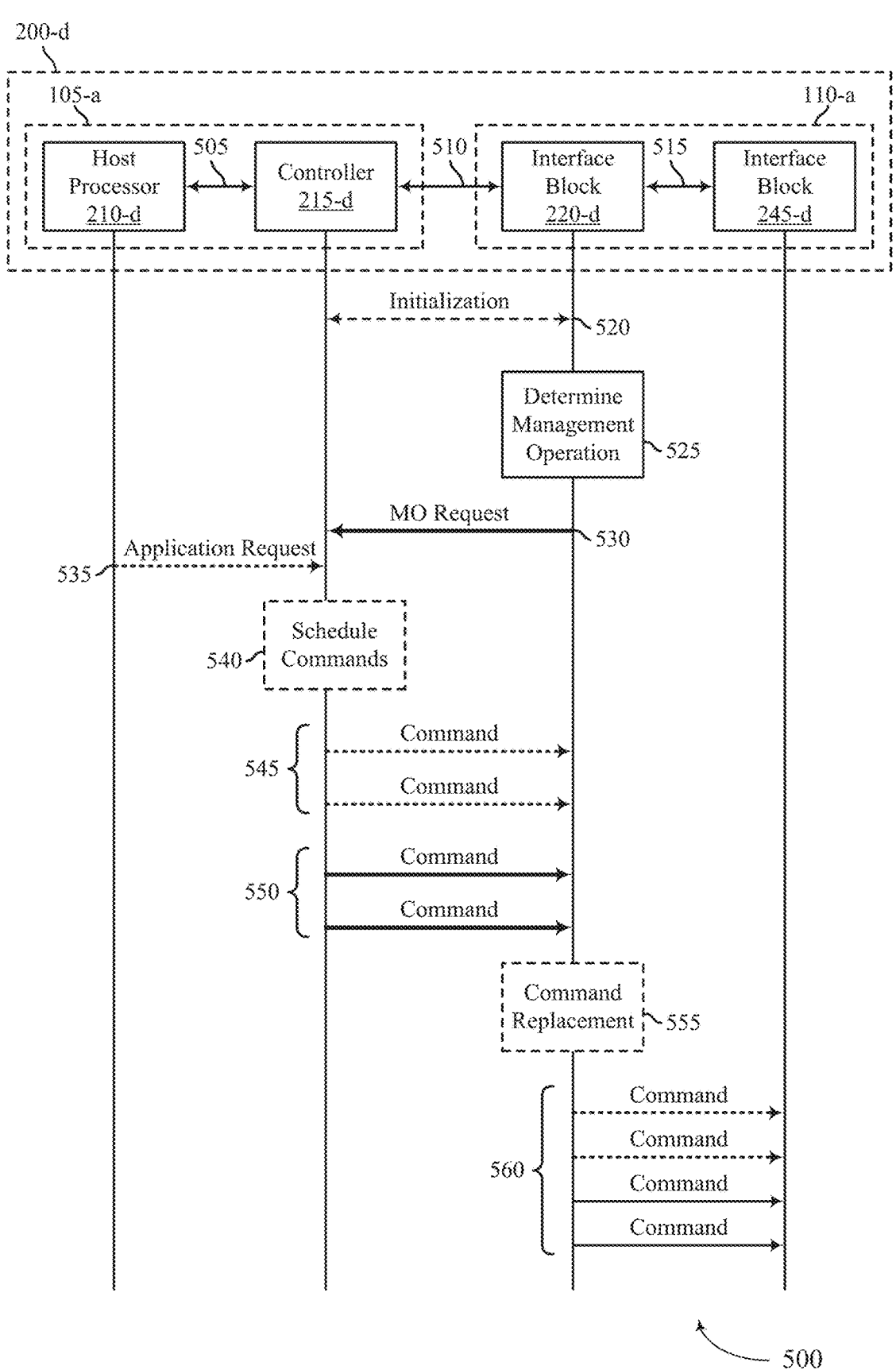
FIG. 5 shows an example of a process that supports management command techniques for stacked memory architectures in accordance with examples as disclosed herein.

FIG. 5 shows an example of a process 500 that supports management command techniques for stacked memory architectures in accordance with examples as disclosed herein. Aspects of the process 500 may be performed by components of a system 200-d, such as a host processor 210-d, a controller 215-d, an interface block 220-d, and an interface block 245-d. The host processor 210-d and the controller 215-d may be components of a host system 105-a, and the interface block 220-d and the interface block 245-d may be components of a memory system 110-a. Although the example of the system 200-d includes a controller 215-d that is coupled with a single interface block 220-d and a single interface block 245-d, the described techniques may be supported by controller 215-d that is coupled with any quantity of one or more interface blocks 220-d or any quantity of one or more interface blocks 245-d.

In some implementations, the interface block 245-d may be a component of a first semiconductor die (e.g., a die 240) and the interface block 220-d may be a component of a second semiconductor die (e.g., a die 205). In various implementations, the controller 215-d may be a component of the second semiconductor die or a component of another semiconductor die that is coupled with the second semiconductor die, and the host processor may be a component of the second semiconductor die, or another semiconductor die (e.g., a same die as the controller 215-d, a different die than the controller 215-d), among other implementations.

The interface block 245-d may be coupled with the interface block via a bus 515, which may include one or more of a bus 301, a bus 302, a bus 303, or a bus 304. The interface block 220-d may be coupled with the controller 215-d via a bus 510, which may be an example of a host interface 216 (e.g., including one or more of a bus 410, a bus

420, a bus 430, a bus 440, or a bus 450). The controller 215-*d* may be coupled with the host processor 210-*d* via a bus 505.

In some examples, at 520, the controller 215-*d* and the interface block 220-*d* may perform an initialization. For example, the controller 215-*d* and the interface block 220-*d* may exchange initialization signaling (e.g., via the bus 510), such as boot signaling, configuration signaling, instruction signaling, or other signaling, and may perform various accompanying operations. In some examples, at part of the initialization of 520, the interface block 220-*d* may transfer information regarding timings, associations of commands for various management operations, or a combination thereof (e.g., from non-volatile storage 235, from one or more instances of non-volatile storage 270, or a combination thereof). For example, the interface block 220-*d* may transmit an indication of a set of identifiers for a set of configured management operations and a respective sequence of commands associated with each management operation of the set of management operations. Table 2 illustrates an example of such management operation identifiers that may be associated with a respective management operation and a respective sequence of operations (e.g., including reference to command IDs, such as those given in Table 1).

TABLE 2

Example Management Operation Command Associations

| ID | Management Operation | Sequence |
|---|---|---|
| 1 | Auto Refresh, Row Hammer Refresh | ACT(2) + Delay(12) + PRE(3) |
| 2 | Scrubbing | ACT(2) + RDA(8) and ACT(2) + WRA(6) |
| 3 | Row Repair | ACT(2) + PRE(3) + ACT(2) + PRE(3) and RNOP(1) |

Additionally, or alternatively (e.g., omitting the initialization operations of 520), timings, associations of commands with management operations, or a combination thereof may be preconfigured at each of the controller 215-*d* and the interface block 220-*d*. For example, such information may be included in a design specification (e.g., of the bus 510, of the controller 215-*d*, of the interface block 220-*d*), such that information regarding timings, associations of commands for various management operations, or a combination thereof may not be communicated from the interface block 220-*d* to the controller 215-*d* (e.g., during the initialization of 520 or otherwise). In some other examples, known associations of management operations and sequences of commands may be omitted, such that management operation requests themselves may include an indication of a requested sequence of commands.

At 525, the interface block 220-*d* (e.g., a media management function) may determine a management operation to be performed. For example, the interface block 220-*d* may determine that criteria for performing a management operation have been satisfied, which may be based on a duration since a prior management operation (e.g., in accordance with a management operation schedule), an indication from a sensor 237 or a sensor 275, an indication of adverse access operations, an indication of a component failure (e.g., an indication to perform a repair or sparing operation), among other criteria.

At 530 (e.g., in response to the determination of 525), the interface block 220-*d* may transmit a management operation (MO) request (e.g., via the bus 510), which may be received by the controller 215-*d*. The request of 530 may be a request for the controller 215-*d* to schedule the interface block 220-*d* to perform a management operation associated with a memory array 250 accessible via the interface block 220-*d* (e.g., via the interface block 245-*d*). In some examples, the request of 530 may be transmitted via a dedicated signal path of the bus 510, such as a bus 450. In various examples, the requested management operation may be a refresh operation on one or more rows of a memory array 250, a row hammer mitigation operation on one or more rows of a memory array 250, a scrubbing operation on one or more rows of a memory array 250, or a repair operation for one or more rows of a memory array 250.

The request of 530 may be associated with various fields of information to be communicated to the controller 215-*d*. For example, a request of 530 may include an identifier (e.g., a tag) for associating responsive commands with the request 530, which may be used to map commands to the request of 530, to distinguish the management operation requested at 530 from other requested management operations, or both. In some examples, a request of 530 may include address information associated with the management operation (e.g., a pseudo-channel indicator, a bank indicator). In some examples, a request of 530 may include an indication of a duration (e.g., a deadline, a latency, a scheduling window, a duration relative to the timing of the transmission or receipt of the request of 530, a duration expressed as a quantity of system cycles) within which the controller 215-*d* is to schedule the interface block 220-*d* to perform the management operation. In some examples, such a duration may be configured to be as long as possible, while supporting a managed performance characteristic, to support relatively higher scheduling flexibility for the controller 215-*d*.

A request of 530 may also include one or more indications of a set of one or more commands (e.g., a sequence of multiple commands, a compound command) that are associated with the management operation determined at 525. For example, a request of 530 may include an indication of an identifier associated with a requested management operation (e.g., an identifier that corresponds to the management operation, such as an identifier communicated during the initialization of 520 or otherwise configured or standardized between the controller 215-*d* and the interface block 220-*d*), where the identifier is known by the interface block 220-*d* and the controller 215-*c* to be associated with a set of one or more commands (e.g., a sequence of multiple commands). In some other examples, a request of 530 may include indications of the commands themselves (e.g., rather than a preconfigured management operation identifier), which may, in some examples, include a set of multiple command identifiers (e.g., including indications of an ACT command, a delay command, and a PRE command for a determined "Auto Refresh" management operation, which may be indicated as a sequence of identifiers, such as identifiers 2, 12, and 3 in accordance with the commands of Table 1 and the management operation definition for a refresh operation of Table 2).

At 540 (e.g., based at least in part on the request of 530), the controller 215-*d* may schedule commands to transmit to the interface block 220-*d* (e.g., at least to perform the management operation requested at 530). In some examples, at least some of the commands scheduled at 540 may be commands to access one or more memory arrays 250 via the interface block 220-*d* (e.g., via the interface block 245-*d*). For example, the commands scheduled at 540 may include one or more row commands, one or more column commands, or a combination thereof. In some examples, the commands may be scheduled at 540 in accordance with an association of the commands with the requested management operation, such as an association communicated during the initialization of 530 or otherwise configured between the controller 215-d and the interface block 220-d. In some examples, the commands of 540 may be scheduled in accordance with configured timings between respective ones of the commanded operations (e.g., in accordance with configured delays).

In some examples, the commands scheduled at 540 for the requested management operation may be coordinated (e.g., by the controller 215-d) with other commands. For example, at 535 the host processor 210-d may transmit an application request (e.g., via the bus 505), which may be received by the controller 215-d. The application request of 535 may be a request for a write operation, or a read operation, or a combination thereof that supports a function or application of the host system 105-a. In some examples, the application request of 535 may be received as one or more commands to access one or more memory arrays 250 (e.g., a memory array 250 corresponding to the management operation requested at 530, a memory array 250 different from a memory array corresponding to the management operation requested at 530, or a combination thereof). In various examples, the application request of 535 may be received before the management operation request of 530 or after the management operation request of 530.

As part of the scheduling of 540, the controller 215-d may evaluate a priority of the application request of 535 and the management operation request of 530. For example, if the application request of 535 is of a relatively high priority, and a duration indicated by the management operation request of 530 supports it, the controller 215-d may be configured to schedule at least some of the commands responsive to the application request of 535 to be transmitted before at least some of the commands responsive to the management operation request of 530. In some examples, such scheduling may consider one or more other management operation requests (e.g., in addition to the management operation requested at 530), which may include prioritization or interleaving of commands for multiple requested management operations. Thus, the scheduling of 540 may support the controller 215-d optimizing command transmission among competing priorities for throughput, latency, reliability, stability, and other priorities.

At 550, the controller 215-d may transmit one or more commands (e.g., a sequence of multiple commands, via the bus 510) for the management operation corresponding to the request of 530, which may be received by the interface block 220-d. In some examples, each of the commands of 540 may include an indication (e.g., a tag, which may be the same tag that is indicated in the request of 530) that the first command is associated with the request of 530 or is otherwise associated with the requested management operation.

In some examples (e.g., where applicable), at 545, the controller 215-d may transmit one or more commands (e.g., via the bus 510) responsive to the application request the request of 535, which may be received by the interface block 220-d. In some examples, each of the commands of 550 may include an indication (e.g., a tag) that the command is not associated with a requested management operation. Although the commands of 545 are illustrated as being transmitted before the commands of 550 are transmitted, in various examples, one or more of the commands of 545 may be transmitted by the controller 215-d between the transmission of or receipt of the request of 530 and transmission of an initial command of commands 550, or transmitted by the controller 215-d between the commands of 550 (e.g., in accordance with an interleaving among the commands of 550 and the commands of 545), or transmitted by the controller 215-d after the commands of 550, or any combination thereof.

At 560, the interface block may transmit one or more commands that each correspond to a received command (e.g., a command of 545, a command of 550), which may be received by the interface block 245-d (e.g., to access one or more memory arrays 250). In some examples, commands of 560 may be transmitted in accordance with a deterministic delay relative to the receipt of corresponding commands by the interface block 220-d (e.g., from the controller 215-d).

In some examples, the interface block 220-d may support a command replacement functionality, which may reduce an amount of information provided to the controller 215-d to support memory management operations (e.g., to reduce an amount of information that is signaled to the controller 215-d, to obscure memory management techniques performed by the interface block 220-d. For example, at 555, the interface block 220-d may replace one or more aspects of the commands of 550, or one or more of the commands of 550 themselves, with other aspects of commands (e.g., for transmission of the commands of 560.

In some examples, such a replacement may be based on whether a command from the controller 215-d is associated with a management operation. For example, if a command received at the interface block 220-d (e.g., a row command, a column command) includes a tag that indicates an association with the management operation request of 530 (e.g., of a command of 550), the interface block 220-d may replace the received command with a management command (e.g., a management row command, a management column command, to be transmitted at 560). Alternatively, if a command received at the interface block 220-d (e.g., a row command, a column command) does not include a tag that indicates an association with the management operation request of 530 (e.g., includes a tag that is not associated with a management operation, as a command of 545), the interface block 220-d may not replace the received command with a management command, but may forward the command to the interface block 245-d (e.g., at 560).

In some examples, a replacement of 555 may include replacing one or more of the commands of 550 with a corresponding command of a different type for transmission at 560. For example, to obscure aspects of a refresh operation from the controller 215-d (e.g., to limit an awareness of the controller 215-d of particular rows being refreshed, among other aspects of the refresh management operation determined by the interface block 220-d), the interface block 220-d may request a management operation associated with an ACT command, a delay, and a PRE command (e.g., of commands at 550) and, after the interface block 220-d receives the commands, the interface block 220-d may replace the ACT command with a refresh command (e.g., at the same address as the ACT command) that performance a refresh on one or more rows (e.g., all rows) of the indicated bank, and replace the PRE command with an RNOP command (e.g., for forwarding to the interface block 245-d in the corresponding commands of 560). In some examples, such associations of commands with a management operation and corresponding replacements may be configured to satisfy timing constraints within the commands 550 and the commands 560.

Additionally, or alternatively, a replacement of 555 may include replacing address information included in one or more of the commands of 550 with new or updated address information for one or more commands for transmission at 560. For example, the interface block 220-*d* may be configured to overwrite one or more fields in commands of 550 that are associated with a management operation (e.g., before forwarding to the interface block 245-*d*) for implementing the management operation, which may obscure aspects of addressing for the management operations from the controller 215-*d*. Additionally, or alternatively, the interface block 220-*d* may be configured to confirm that audited commands (e.g., audited DRAM commands) follow the same timing constraints as commands that are not associated with management operations. Such a configuration may minimize information (e.g., configuration information, timing information) involved with configuring the host interface 216, thereby simplifying aspects of management operation scheduling.

The process 500 may illustrate a functional division of techniques between the controller 215-*d* and the interface block 220-*d* for supporting management operations of the memory system 110-*a*. For example, relative to command scheduling, the controller 215-*d* may have full control of scheduling, whereas the interface block 245-*d* may have no control of scheduling (e.g., outside of an indicated duration within which to schedule management operation commands). Regarding a configured command set, the controller 215-*d* may be configured for generating the commands, whereas the interface block 220-*d* may be configured to generally pass through such commands (e.g., with the exception of replacement techniques of 555). Regarding the management operations themselves, the interface block 220-*d* may be configured to determine the management operations and transmit requests to the controller 215-*d*, whereas the controller 215-*d* may be configured to process such a request and issue responsive commands (e.g., commands of 550). Thus, the functional split illustrated by the process 500 for the system 200-*d* may support various improvements for scheduling flexibility, performance optimization, management operation definition and configuration, and obscuring of memory management techniques in a closely-coupled implementation of semiconductor dies, among other benefits.

Figure 6:
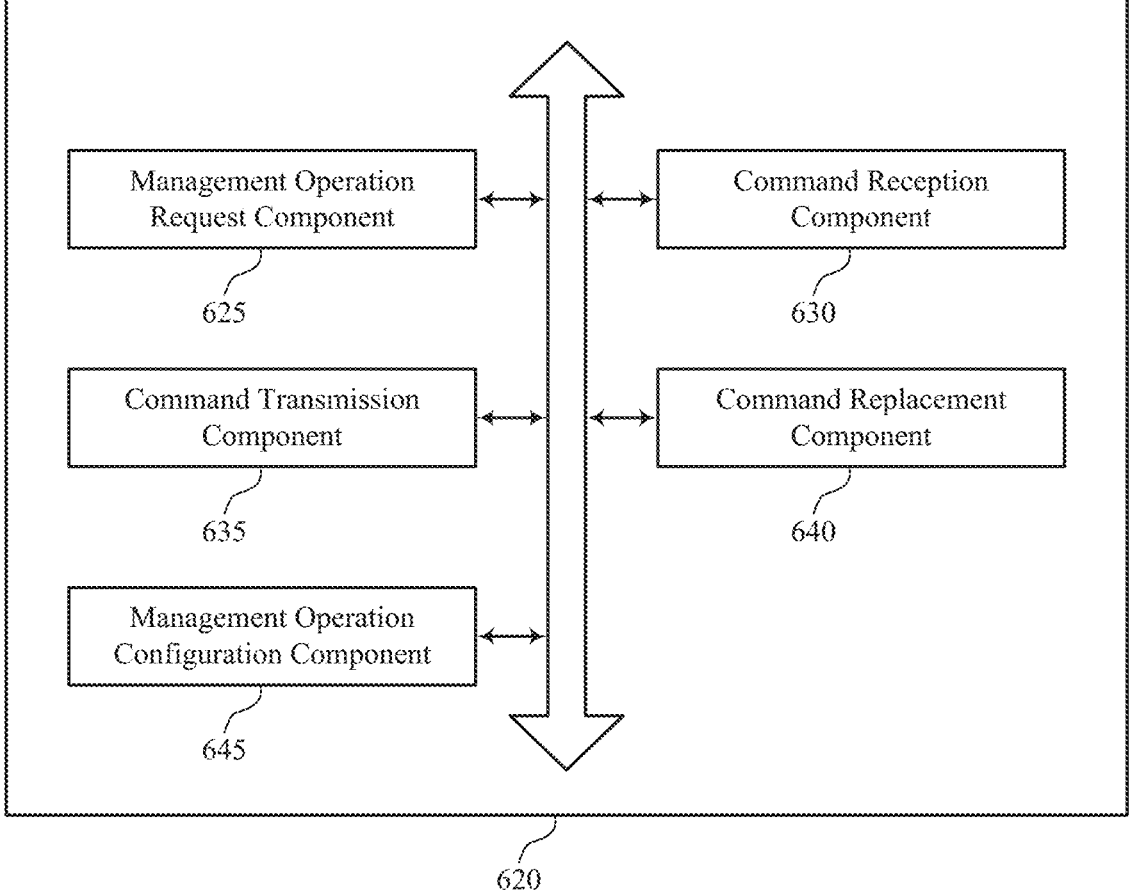
FIG. 6 shows a block diagram of a memory interface that supports management command techniques for stacked memory architectures in accordance with examples as disclosed herein.

FIG. 6 shows a block diagram 600 of a memory interface 620 (e.g., an interface) that supports management command techniques for stacked memory architectures in accordance with examples as disclosed herein. The memory interface 620 may be an example of aspects of an interface block 220, which may be included in a die 205, as described with reference to FIGS. 1 through 5. The memory interface 620, or various components thereof, may be an example of means for performing various aspects of management command techniques for stacked memory architectures as described herein. For example, the memory interface 620 may include a management operation request component 625, a command reception component 630, a command transmission component 635, a command replacement component 640, a management operation configuration component 645, or any combination thereof. Each of these components, or components of subcomponents thereof (e.g., one or more processors, one or more memories), may communicate, directly or indirectly, with one another (e.g., via one or more buses).

The management operation request component 625 may be configured as or otherwise support a means for transmitting, from the memory interface 620 (e.g., an interface block 220, of a die 205) to a controller (e.g., a controller 215, of the die 205), a request for the controller to schedule the memory interface 620 to perform a management operation associated with a memory array (e.g., one or more memory arrays 250) of one or more first semiconductor dies (e.g., dies 240, coupled with the die 205). The command reception component 630 may be configured as or otherwise support a means for receiving, at the memory interface 620 from the controller based on the request, a sequence of multiple first commands for the management operation. The command transmission component 635 may be configured as or otherwise support a means for transmitting, from the memory interface 620 to at least one of the one or more first semiconductor dies, one or more second commands to perform the management operation on the memory array, the one or more second commands each corresponding to one of the first commands.

In some examples, the first commands may be commands to access the memory array. In some examples, each first command may include an indication that the first command is associated with the management operation.

In some examples, the request may include a tag for associating the first commands with the request. In some examples, the indication may include the tag to associate the first command with the management operation based on the request including the tag.

In some examples, the command replacement component 640 may be configured as or otherwise support a means for replacing, based on the sequence of multiple first commands being for the management operation, the first commands with the one or more second commands based on the management operation requested to be scheduled, and transmitting the one or more second commands may be based on the replacing.

In some examples, to support replacing the first commands, the command replacement component 640 may be configured as or otherwise support a means for replacing one or more of the first commands with a corresponding second command of a different type.

In some examples, the command replacement component 640 may be configured as or otherwise support a means for replacing first address information included in one or more of the first commands with second address information.

In some examples, the command reception component 630 may be configured as or otherwise support a means for receiving, at the memory interface 620 from the controller, one or more third commands to access the memory array or another memory array of the one or more first semiconductor dies, and the one or more third commands may be received between the transmission of the request and the reception of an initial first command of the sequence of multiple first commands, between first commands of the sequence of multiple first commands, or a combination thereof.

In some examples, the request may include a tag for associating the first commands with the request, address information associated with the management operation, a first indication of a duration within which the controller is requested to schedule the interface to perform the management operation, a second indication of the sequence of multiple first commands, or a combination thereof.

In some examples, to support transmitting the request, the management operation request component 625 may be configured as or otherwise support a means for transmitting the request via a dedicated bus between the memory interface 620 and the controller different from one or more buses via which the sequence of multiple first commands are received.

In some examples, the sequence of multiple first commands may include one or more row commands, one or more column commands, or a combination thereof.

In some examples, the management operation configuration component 645 may be configured as or otherwise support a means for transmitting, from the memory interface 620 to the controller before transmitting the request (e.g., during an initialization operation), an indication of a set of identifiers for a set of management operations including the management operation and a respective sequence of multiple commands associated with each management operation of the set of management operations. In some examples, the request may be for the management operation based on the request including an identifier corresponding to the management operation. In some examples, the sequence of multiple first commands may be received in accordance with the indication.

In some examples, the management operation may include a refresh operation on one or more rows of the memory array, a row hammer mitigation operation on one or more rows of the memory array, a scrubbing operation on one or more rows of the memory array, or a repair operation for one or more rows of the memory array.

In some examples, the sequence of multiple first commands and the one or more second commands may be associated with a same execution duration.

In some examples, the described functionality of the memory interface 620, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory interface 620, or various components thereof, may be implemented at least in part by instructions (e.g., stored in memory, non-transitory computer-readable medium) executable by such at least one processor.

Figure 7:
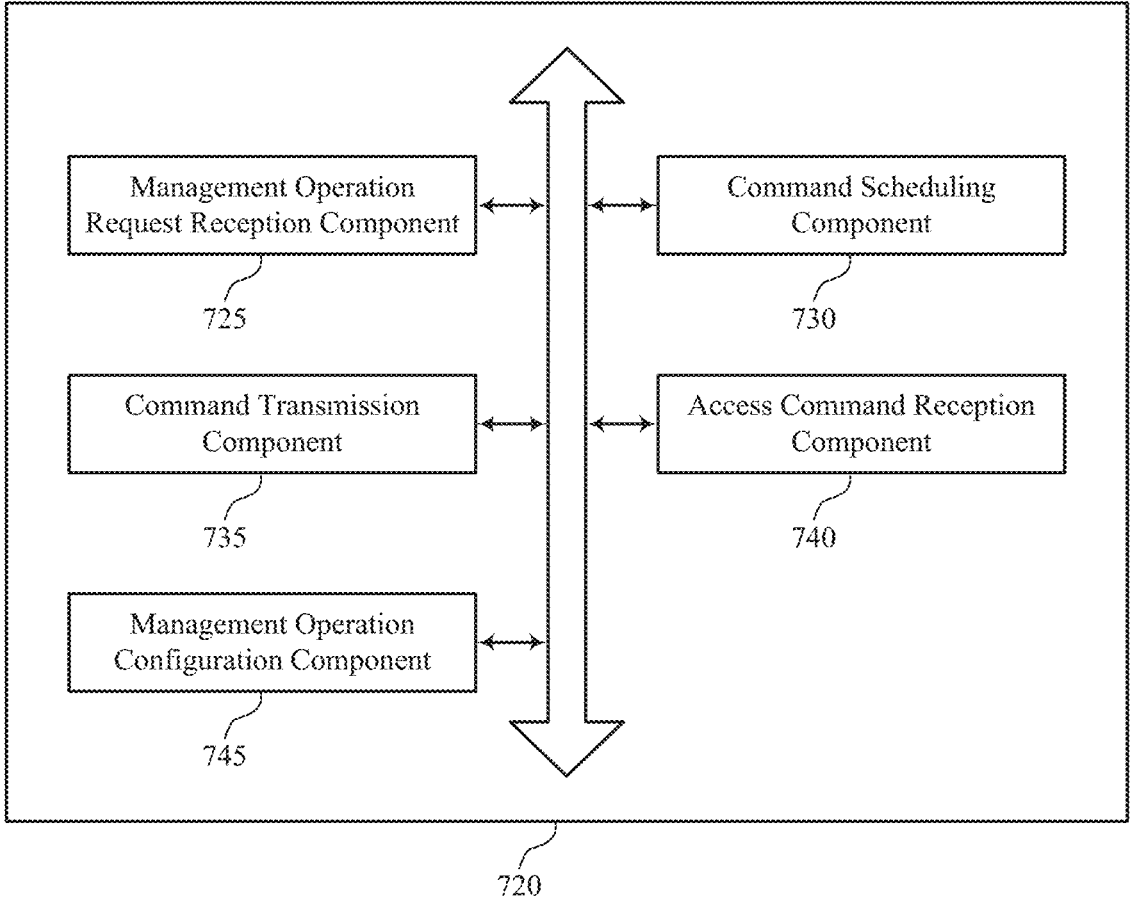
FIG. 7 shows a block diagram of a memory controller that supports management command techniques for stacked memory architectures in accordance with examples as disclosed herein.

FIG. 7 shows a block diagram 700 of a memory controller 720 that supports management command techniques for stacked memory architectures in accordance with examples as disclosed herein. The memory controller 720 may be an example of aspects of a controller 215 (e.g., a host controller, a host memory controller) as described with reference to FIGS. 1 through 5. The memory controller 720, or various components thereof, may be an example of means for performing various aspects of management command techniques for stacked memory architectures as described herein. For example, the memory controller 720 may include a management operation request reception component 725, a command scheduling component 730, a command transmission component 735, an access command reception component 740, a management operation configuration component 745, or any combination thereof. Each of these components, or components of subcomponents thereof (e.g., one or more processors, one or more memories), may communicate, directly or indirectly, with one another (e.g., via one or more buses).

The management operation request reception component 725 may be configured as or otherwise support a means for receiving, at the memory controller 720 (e.g., a memory controller, of a die 205) from an interface (e.g., an interface block 220, of the die 205), a request for the memory controller 720 to schedule the interface to perform a management operation associated with one or more memory arrays (e.g., memory arrays 250) of one or more first semiconductor dies (e.g., dies 240, coupled with the die 205). The command scheduling component 730 may be configured as or otherwise support a means for determining, at the memory controller 720 based on the request, a sequence of multiple commands for the management operation. The command transmission component 735 may be configured as or otherwise support a means for transmitting, from the memory controller 720 to the interface based on the determining, the sequence of multiple commands for the management operation.

In some examples, the request may include a tag for associating the commands for the management operation with the request, address information associated with the management operation, a first indication of a duration within which the controller is requested to schedule the interface to perform the management operation, a second indication of the sequence of multiple commands, or a combination thereof.

In some examples, the command scheduling component 730 may be configured as or otherwise support a means for scheduling the interface to perform the management operation within a duration from the reception of the request, the duration indicated by the request. In some examples, the sequence of multiple commands may be transmitted in accordance with the scheduling.

In some examples, the access command reception component 740 may be configured as or otherwise support a means for receiving, at the memory controller 720, one or more second commands to access the one or more memory arrays of the one or more first semiconductor dies. In some examples, the command transmission component 735 may be configured as or otherwise support a means for transmitting, from the memory controller 720 to the interface based on the one or more second commands, one or more third commands to access the one or more memory arrays.

In some examples, the commands for the management operation may each include a first indication that the command is associated with the management operation. In some examples, the one or more third commands may each include a second indication that the third command is not associated with the management operation.

In some examples, the request may include a tag for associating the commands for the management operation with the request. In some examples, the first indication includes the tag to associate the command with the management operation based on the request including the tag.

In some examples, the one or more third commands may be transmitted between the reception of the request and the transmission of an initial command for the management operation of the sequence of multiple commands, between transmission of commands of the sequence of multiple commands, or a combination thereof.

In some examples, to support receiving the request, the management operation request reception component 725 may be configured as or otherwise support a means for receiving the request via a dedicated bus between the interface and the memory controller 720 different from one or more buses via which one or more third commands are transmitted.

In some examples, the sequence of multiple commands may include one or more row commands, one or more column commands, or a combination thereof.

In some examples, the management operation configuration component 745 may be configured as or otherwise support a means for receiving, at the memory controller 720 from the interface before receiving the request (e.g., during an initialization operation), an indication of a set of identifiers for a set of management operations including the management operation and a respective sequence of multiple commands associated with each management operation of the set of management operations. In some examples, the request may be for the management operation based on the request including an identifier corresponding to the management operation. In some examples, the sequence of multiple commands may be transmitted in accordance with the indication.

In some examples, the described functionality of the memory controller 720, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory controller 720, or various components thereof, may be implemented at least in part by instructions (e.g., stored in memory, non-transitory computer-readable medium) executable by such at least one processor.

FIG. 8 shows a flowchart illustrating a method 800 that supports management command techniques for stacked memory architectures in accordance with examples as disclosed herein. The operations of method 800 may be implemented by a memory interface or its components as described herein. For example, the operations of method 800 may be performed by a memory interface (e.g., an interface block 220, of a die 205, a memory interface 620) as described with reference to FIGS. 1 through 6. In some examples, a memory interface may execute a set of instructions to control the functional elements of the device to perform the described functions. Additionally, or alternatively, the memory interface may perform aspects of the described functions using special-purpose hardware.

At 805, the method may include transmitting, from an interface of a second semiconductor die (e.g., an interface block 220 of a die 205) to a controller of the second semiconductor die (e.g., a controller 215 of the die 205), a request for the controller to schedule the interface to perform a management operation associated with a memory array of one or more first semiconductor dies (e.g., of one or more memory arrays 250 of one or more dies 240) coupled with the second semiconductor die. In some examples, aspects of the operations of 805 may be performed by a management operation request component 625 as described with reference to FIG. 6.

At 810, the method may include receiving, at the interface from the controller based on the request, a sequence of multiple first commands for the management operation. In some examples, aspects of the operations of 810 may be performed by a command reception component 630 as described with reference to FIG. 6.

At 815, the method may include transmitting, from the interface to at least one of the one or more first semiconductor dies, one or more second commands to perform the management operation on the memory array, the one or more second commands each corresponding to one of the first commands. In some examples, aspects of the operations of 815 may be performed by a command transmission component 635 as described with reference to FIG. 6.

In some examples, an apparatus (e.g., a semiconductor die apparatus, a semiconductor system apparatus) as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for transmitting, from an interface of a second semiconductor die to a controller of the second semiconductor die, a request for the controller to schedule the interface to perform a management operation associated with a memory array of one or more first semiconductor dies coupled with the second semiconductor die; receiving, at the interface from the controller based on the request, a sequence of multiple first commands for the management operation; and transmitting, from the interface to at least one of the one or more first semiconductor dies, one or more second commands to perform the management operation on the memory array, the one or more second commands each corresponding to one of the first commands.

Aspect 2: The method, apparatus, or non-transitory computer-readable medium of aspect 1, where the first commands are commands to access the memory array and each first command includes an indication that the first command is associated with the management operation.

Aspect 3: The method, apparatus, or non-transitory computer-readable medium of aspect 2, where the request includes a tag for associating the first commands with the request and the indication includes the tag to associate the first command with the management operation based on the request including the tag.

Aspect 4: The method, apparatus, or non-transitory computer-readable medium of any of aspects 1 through 3, further including operations, features, circuitry, logic, means, or instructions, or any combination thereof for replacing, based on the sequence of multiple first commands being for the management operation, the first commands with the one or more second commands based on the management operation requested to be scheduled, where transmitting the one or more second commands is based on the replacing.

Aspect 5: The method, apparatus, or non-transitory computer-readable medium of aspect 4, where replacing the first commands includes operations, features, circuitry, logic, means, or instructions, or any combination thereof for replacing one or more of the first commands with a corresponding second command of a different type.

Aspect 6: The method, apparatus, or non-transitory computer-readable medium of any of aspects 4 through 5, further including operations, features, circuitry, logic, means, or instructions, or any combination thereof for replacing first address information included in one or more of the first commands with second address information.

Aspect 7: The method, apparatus, or non-transitory computer-readable medium of any of aspects 1 through 6, further including operations, features, circuitry, logic, means, or instructions, or any combination thereof for receiving, at the interface from the controller, one or more third commands to access the memory array or another memory array of the one or more first semiconductor dies, where the one or more third commands are received between the transmission of the request and the reception of an initial first command of the sequence of multiple first commands, between first commands of the sequence of multiple first commands, or a combination thereof.

Aspect 8: The method, apparatus, or non-transitory computer-readable medium of any of aspects 1 through 7, where the request includes a tag for associating the first commands with the request, address information associated with the management operation, a first indication of a duration within which the controller is requested to schedule the interface to perform the management operation, a second indication of the sequence of multiple first commands, or a combination thereof.

Aspect 9: The method, apparatus, or non-transitory computer-readable medium of any of aspects 1 through 8, where transmitting the request includes operations, features, circuitry, logic, means, or instructions, or any combination thereof for transmitting the request via a dedicated bus between the interface and the controller different from one or more buses via which the sequence of multiple first commands are received.

Aspect 10: The method, apparatus, or non-transitory computer-readable medium of any of aspects 1 through 9, where the sequence of multiple first commands includes one or more row commands, one or more column commands, or a combination thereof.

Aspect 11: The method, apparatus, or non-transitory computer-readable medium of any of aspects 1 through 10, further including operations, features, circuitry, logic, means, or instructions, or any combination thereof for transmitting, from the interface to the controller before transmitting the request, an indication of a set of identifiers for a set of management operations including the management operation and a respective sequence of multiple commands associated with each management operation of the set of management operations; where the request is for the management operation based on the request including an identifier corresponding to the management operation; and where the sequence of multiple first commands is received in accordance with the indication.

Aspect 12: The method, apparatus, or non-transitory computer-readable medium of any of aspects 1 through 11, where the management operation includes a refresh operation on one or more rows of the memory array, a row hammer mitigation operation on one or more rows of the memory array, a scrubbing operation on one or more rows of the memory array, or a repair operation for one or more rows of the memory array.

Aspect 13: The method, apparatus, or non-transitory computer-readable medium of any of aspects 1 through 12, where the sequence of multiple first commands and the one or more second commands are associated with a same execution duration.

FIG. 9 shows a flowchart illustrating a method 900 that supports management command techniques for stacked memory architectures in accordance with examples as disclosed herein. The operations of method 900 may be implemented by a memory controller or its components as described herein. For example, the operations of method 900 may be performed by a memory controller (e.g., a controller 215, of a die 205 or another die coupled with a die 205, a memory controller 720) as described with reference to FIGS. 1 through 5 and 7. In some examples, a memory controller may execute a set of instructions to control the functional elements of the device to perform the described functions. Additionally, or alternatively, the memory controller may perform aspects of the described functions using special-purpose hardware.

At 905, the method may include receiving, at a controller of a second semiconductor die (e.g., a controller 215 of a die 205) from an interface of the second semiconductor die (e.g., an interface block 220 of the die 205), a request for the controller to schedule the interface to perform a management operation associated with one or more memory arrays of one or more first semiconductor dies (e.g., of one or more memory arrays 250 of one or more dies 240) coupled with the second semiconductor die. In some examples, aspects of the operations of 905 may be performed by a management operation request reception component 725 as described with reference to FIG. 7.

At 910, the method may include determining, at the controller based on the request, a sequence of multiple commands for the management operation. In some examples, aspects of the operations of 910 may be performed by a command scheduling component 730 as described with reference to FIG. 7.

At 915, the method may include transmitting, from the controller to the interface based on the determining, the sequence of multiple commands for the management operation. In some examples, aspects of the operations of 915 may be performed by a command transmission component 735 as described with reference to FIG. 7.

In some examples, an apparatus (e.g., a semiconductor die apparatus, a semiconductor system apparatus) as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for receiving, at a controller of a second semiconductor die from an interface of the second semiconductor die, a request for the controller to schedule the interface to perform a management operation associated with one or more memory arrays of one or more first semiconductor dies coupled with the second semiconductor die; determining, at the controller based on the request, a sequence of multiple commands for the management operation; and transmitting, from the controller to the interface based on the determining, the sequence of multiple commands for the management operation.

Aspect 15: The method, apparatus, or non-transitory computer-readable medium of aspect 14, where the request includes a tag for associating the commands for the management operation with the request, address information associated with the management operation, a first indication of a duration within which the controller is requested to schedule the interface to perform the management operation, a second indication of the sequence of multiple commands, or a combination thereof.

Aspect 16: The method, apparatus, or non-transitory computer-readable medium of any of aspects 14 through 15, further including operations, features, circuitry, logic, means, or instructions, or any combination thereof for scheduling the interface to perform the management operation within a duration from the reception of the request, the duration indicated by the request and where the sequence of multiple commands are transmitted in accordance with the scheduling.

Aspect 17: The method, apparatus, or non-transitory computer-readable medium of any of aspects 14 through 16, further including operations, features, circuitry, logic, means, or instructions, or any combination thereof for receiving, at the controller of the second semiconductor die, one or more second commands to access the one or more memory arrays of the one or more first semiconductor dies and transmitting, from the controller to the interface based on the one or more second commands, one or more third commands to access the one or more memory arrays.

Aspect 18: The method, apparatus, or non-transitory computer-readable medium of aspect 17, where the commands for the management operation each include a first indication that the command is associated with the management operation and the one or more third commands each include a second indication that the third command is not associated with the management operation.

Aspect 19: The method, apparatus, or non-transitory computer-readable medium of aspect 18, where the request includes a tag for associating the commands for the management operation with the request and the first indication includes the tag to associate the command with the management operation based on the request including the tag.

Aspect 20: The method, apparatus, or non-transitory computer-readable medium of any of aspects 17 through 19, where the one or more third commands are transmitted between the reception of the request and the transmission of an initial command for the management operation of the sequence of multiple commands, between transmission of commands of the sequence of multiple commands, or a combination thereof.

Aspect 21: The method, apparatus, or non-transitory computer-readable medium of any of aspects 14 through 20, where receiving the request includes operations, features, circuitry, logic, means, or instructions, or any combination thereof for receiving the request via a dedicated bus between the interface and the controller different from one or more buses via which one or more third commands are transmitted.

Aspect 22: The method, apparatus, or non-transitory computer-readable medium of any of aspects 14 through 21, where the sequence of multiple commands includes one or more row commands, one or more column commands, or a combination thereof.

Aspect 23: The method, apparatus, or non-transitory computer-readable medium of any of aspects 14 through 22, further including operations, features, circuitry, logic, means, or instructions, or any combination thereof for receiving, at the controller from the interface before receiving the request, an indication of a set of identifiers for a set of management operations including the management operation and a respective sequence of multiple commands associated with each management operation of the set of management operations; where the request is for the management operation based on the request including an identifier corresponding to the management operation; and where the sequence of multiple commands is transmitted in accordance with the indication.

It should be noted that the aspects described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 24: An apparatus, including: a second semiconductor die (e.g., a die 205) including a controller (e.g., a controller 215) and an interface (e.g., an interface block 220) coupled with the controller, the interface including circuitry operable to: transmit, to the controller, a request for the controller to schedule the interface to perform a management operation associated with one or more memory arrays of one or more first semiconductor dies coupled with the second semiconductor die; receive, from the controller based on the request, a sequence of multiple first commands for the management operation; and transmit, to at least one of the one or more first semiconductor dies, one or more second commands to perform the management operation on the memory array, the one or more second commands each corresponding to one of the first commands.

An apparatus is described. The following provides an overview of aspects of the apparatus as described herein:

Aspect 25: An apparatus, including: a second semiconductor die (e.g., a die 205) including a controller (e.g., a controller 215) and an interface (e.g., an interface block 220) coupled with the controller, the controller including circuitry operable to: receive a request for the controller to schedule the interface to perform a management operation associated with one or more memory arrays of one or more first semiconductor dies coupled with the second semiconductor die; determine, based on the request, a sequence of multiple commands for the management operation; and transmit, from the controller to the interface based on the determination, the sequence of multiple commands for the management operation.

A system is described. The following provides an overview of aspects of the apparatus as described herein:

Aspect 26: A system (e.g., a system 200), including: one or more first semiconductor dies (e.g., one or more dies 240) including: one or more memory arrays (e.g., memory arrays 250); and one or more first interfaces (e.g., interface blocks 245) each including first circuitry operable to access at least one corresponding memory array of the one or more memory arrays; and a second semiconductor die (e.g., a die 205) coupled with the one or more first semiconductor dies, the second semiconductor die including: one or more controllers (e.g., controllers 215), each controller operable to: receive commands to access the one or more memory arrays; and schedule access of the one or more memory arrays based on receiving the access commands; and one or more second interfaces (e.g., interface blocks 220) coupled with the one or more controllers, each second interface including second circuitry operable to: transmit, to a corresponding controller, a request for the corresponding controller to schedule the second interface to perform a management operation associated with a memory array of the one or more memory arrays; receive, from the corresponding controller based on the request, a sequence of multiple first commands for the management operation; and transmit, to a first interface corresponding to the memory array, one or more second commands to perform the management operation on the memory array, the one or more second commands each corresponding to one of the first commands.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. A conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or may be an indirect conductive path that includes intermediate components, such as switches, transistors, or other components. In some examples, the flow of signals between the connected components may be interrupted for a time, for example, using one or more intermediate components such as switches or transistors.

The term "isolated" may refer to a relationship between components in which signals are not presently capable of flowing between the components. Components are isolated from each other if there is an open circuit between them. For example, two components separated by a switch that is positioned between the components are isolated from each other when the switch is open. When a component isolates two components, the component may initiate a change that prevents signals from flowing between the other components using a conductive path that previously permitted signals to flow.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component may initiate a change that allows signals to flow between the other components over a conductive path that previously did not permit signals to flow.

The description set forth herein, in connection with the appended drawings, describes example configurations and does not represent all the examples that may be implemented or that are within the scope of the claims. The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Similar components may be distinguished by following the reference label by one or more dashes and additional labeling that distinguishes among the similar components. If just the first reference label is used in the specification, the description is applicable to any one of the similar components having the same first reference label irrespective of the additional reference labels.

The functions described herein may be implemented in hardware, software executed by a processing system (e.g., one or more processors, one or more controllers, control circuitry processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processor. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, that can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or a processor.

The descriptions and drawings are provided to enable a person having ordinary skill in the art to make or use the disclosure. Various modifications to the disclosure will be apparent to the person having ordinary skill in the art, and the techniques disclosed herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a second semiconductor die comprising a controller and a second interface coupled with the controller via a host interface, the second interface operable to couple with one or more first interfaces of one or more first semiconductor dies, the second interface comprising circuitry operable to:
transmit, to the controller and via the host interface, a request for the controller to schedule the second interface to perform a management operation associated with a memory array of the one or more first semiconductor dies coupled with the second semiconductor die;
receive, from the controller based on the request and via the host interface, a sequence of multiple first commands for the management operation; and
transmit, to at least one first interface of at least one of the one or more first semiconductor dies, one or more second commands to perform the management operation on the memory array, the one or more second commands each corresponding to one of the first commands.

2. The apparatus of claim 1, wherein:
the first commands are commands to access the memory array, and
each first command comprises an indication that the first command is associated with the management operation.

3. The apparatus of claim 2, wherein:
the request comprises a tag for associating the first commands with the request, and
the indication comprises the tag to associate the first command with the management operation based on the request comprising the tag.

4. The apparatus of claim 1, wherein the request comprises a tag for associating the first commands with the request, address information associated with the management operation, a first indication of a duration within which the controller is requested to schedule the second interface to perform the management operation, a second indication of the sequence of multiple first commands, or a combination thereof.

5. The apparatus of claim 1, wherein, to transmit the request, the circuitry is operable to:
transmit the request via a dedicated bus between the second interface and the controller different from one or more buses via which the sequence of multiple first commands are received.

6. The apparatus of claim 1, wherein the sequence of multiple first commands comprise one or more row commands, one or more column commands, or a combination thereof.

7. The apparatus of claim 1, wherein the circuitry is further operable to:
transmit, to the controller before transmitting the request, an indication of a set of identifiers for a set of management operations comprising the management operation and a respective sequence of multiple commands associated with each management operation of the set of management operations, wherein:
the request is for the management operation based on the request comprising an identifier corresponding to the management operation; and
the sequence of multiple first commands is received in accordance with the indication.

8. The apparatus of claim 1, wherein the management operation comprises a refresh operation on one or more rows of the memory array, a row hammer mitigation operation on one or more rows of the memory array, a scrubbing operation on one or more rows of the memory array, or a repair operation for one or more rows of the memory array.

9. The apparatus of claim 1, wherein the sequence of multiple first commands and the one or more second commands are associated with a same execution duration.

10. An apparatus, comprising:
a second semiconductor die comprising a controller and an interface coupled with the controller, the interface comprising circuitry operable to:
transmit, to the controller, a request for the controller to schedule the interface to perform a management operation associated with a memory array of one or more first semiconductor dies coupled with the second semiconductor die;
receive, from the controller based on the request, a sequence of multiple first commands for the management operation;
replace, based on the sequence of multiple first commands being for the management operation, the first commands with one or more second commands to perform the management operation on the memory array based on the management operation requested to be scheduled; and
transmit, to at least one of the one or more first semiconductor dies, the one or more second commands based on the replacing, the one or more second commands each corresponding to one of the first commands.

11. The apparatus of claim 10, wherein, to replace the first commands, the circuitry is operable to:
replace one or more of the first commands with a corresponding second command of a different type.

12. The apparatus of claim 10, wherein the circuitry is further operable to:
replace first address information included in one or more of the first commands with second address information.

13. An apparatus, comprising:
a second semiconductor die comprising a controller and an interface coupled with the controller, the interface comprising circuitry operable to:
transmit, to the controller, a request for the controller to schedule the interface to perform a management operation associated with a memory array of one or more first semiconductor dies coupled with the second semiconductor die;
receive one or more third commands to access the memory array or another memory array of the one or more first semiconductor dies, wherein the one or more third commands are received between the transmission of the request and reception of an initial first command of a sequence of multiple first commands, between first commands of the sequence of multiple first commands, or a combination thereof;

receive, from the controller based on the request, the sequence of multiple first commands for the management operation; and transmit, to at least one of the one or more first semiconductor dies, one or more second commands to perform the management operation on the memory array, the one or more second commands each corresponding to one of the first commands.

14. A method, comprising:

transmitting, from a second interface of a second semiconductor die to a controller of the second semiconductor die and via a host interface, a request for the controller to schedule the second interface to perform a management operation associated with a memory array of one or more first semiconductor dies that comprise one or more first interfaces that are coupled with the second interface of the second semiconductor die;

receiving, at the second interface from the controller based on the request and via the host interface, a sequence of multiple first commands for the management operation; and transmitting, from the second interface to at least one first interface of at least one of the one or more first semiconductor dies, one or more second commands to perform the management operation on the memory array, the one or more second commands each corresponding to one of the first commands.

15. The method of claim 14, wherein:

the first commands are commands to access the memory array, and each first command comprises an indication that the first command is associated with the management operation.

16. The method of claim 15, wherein:

the request comprises a tag for associating the first commands with the request, and each first command comprises the tag to associate the first command with the management operation based on the request comprising the tag.

17. The method of claim 14, wherein the request comprises a tag for associating the first commands with the request, address information associated with the management operation, a first indication of a duration within which the controller is requested to schedule the second interface to perform the management operation, a second indication of the sequence of multiple first commands, or a combination thereof.

18. The method of claim 14, wherein transmitting the request comprises:

transmitting the request via a dedicated bus between the second interface and the controller different from one or more buses via which the sequence of multiple first commands are received.

19. The method of claim 14, wherein the sequence of multiple first commands comprise one or more row commands, one or more column commands, or a combination thereof.

20. The method of claim 14, further comprising:

transmitting, from the second interface to the controller before transmitting the request, an indication of a set of identifiers for a set of management operations comprising the management operation and a respective sequence of multiple commands associated with each management operation of the set of management operations, wherein:

the request is for the management operation based on the request comprising an identifier corresponding to the management operation; and the sequence of multiple first commands is received in accordance with the indication.

21. The method of claim 14, wherein the management operation comprises a refresh operation on one or more rows of the memory array, a row hammer mitigation operation on one or more rows of the memory array, a scrubbing operation on one or more rows of the memory array, or a repair operation for one or more rows of the memory array.

22. The method of claim 14, wherein the sequence of multiple first commands and the one or more second commands are associated with a same execution duration.

23. A method, comprising:

transmitting, from an interface of a second semiconductor die to a controller of the second semiconductor die, a request for the controller to schedule the interface to perform a management operation associated with a memory array of one or more first semiconductor dies coupled with the second semiconductor die;

receiving, at the interface from the controller based on the request, a sequence of multiple first commands for the management operation;

replacing, based on the sequence of multiple first commands being for the management operation, the first commands with one or more second commands to perform the management operation on the memory array based on the management operation requested to be scheduled; and transmitting, from the interface to at least one of the one or more first semiconductor dies, the one or more second commands based on the replacing, the one or more second commands each corresponding to one of the first commands.

24. The method of claim 23, wherein replacing the first commands comprises:

replacing one or more of the first commands with a corresponding second command of a different type.

25. The method of claim 23, further comprising:

replacing first address information included in one or more of the first commands with second address information.

26. The method of claim 23, further comprising:

receiving, at the interface from the controller, one or more third commands to access the memory array or another memory array of the one or more first semiconductor dies, wherein the one or more third commands are received between the transmission of the request and the reception of an initial first command of the sequence of multiple first commands, between first commands of the sequence of multiple first commands, or a combination thereof.

27. A system, comprising:

one or more first semiconductor dies comprising:

one or more memory arrays; and one or more first interfaces each comprising first circuitry operable to access at least one corresponding memory array of the one or more memory arrays; and a second semiconductor die coupled with the one or more first semiconductor dies, the second semiconductor die comprising:

one or more controllers, each controller operable to:

receive commands to access the one or more memory arrays; and schedule access of the one or more memory arrays based on receiving the commands; and one or more second interfaces coupled with the one or more controllers via one or more host interfaces and coupled with the one or more first interfaces, each second interface comprising second circuitry operable to:

transmit, to a corresponding controller and via a corresponding host interface, a request for the corresponding controller to schedule the second interface to perform a management operation associated with a memory array of the one or more memory arrays;

receive, from the corresponding controller based on the request and via the corresponding host interface, a sequence of multiple first commands for the management operation; and transmit, to a first interface of the one or more first interfaces that corresponds to the memory array, one or more second commands to perform the management operation on the memory array, the one or more second commands each corresponding to one of the first commands.

* * * * *